US009889712B2

(12) United States Patent
Nagahara et al.

(10) Patent No.: US 9,889,712 B2
(45) Date of Patent: Feb. 13, 2018

(54) PNEUMATIC TIRE

(71) Applicant: SUMITOMO RUBBER INDUSTRIES LTD., Kobe-shi (JP)

(72) Inventors: Naoya Nagahara, Kobe (JP); Junichi Nagata, Kobe (JP); Kiyotaka Ueyama, Kobe (JP); Yoshihiro Hada, Kobe (JP); Hiroshi Okagawa, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 255 days.

(21) Appl. No.: 14/701,920

(22) Filed: May 1, 2015

(65) Prior Publication Data
US 2015/0314654 A1 Nov. 5, 2015

(30) Foreign Application Priority Data

May 2, 2014 (JP) .................................. 2014-094923

(51) Int. Cl.
*B60C 15/02* (2006.01)
*B60C 15/024* (2006.01)
(Continued)

(52) U.S. Cl.
CPC ............ *B60C 17/0009* (2013.01); *B60C 5/00* (2013.01); *B60C 15/024* (2013.01);
(Continued)

(58) Field of Classification Search
CPC ....... B60C 15/00; B60C 15/02; B60C 15/024; B60C 15/0242; B60C 17/00
See application file for complete search history.

(56) References Cited

U.S. PATENT DOCUMENTS 3,921,693 A * 11/1975 Suzuki .................. B60C 15/06
152/541
4,365,659 A   12/1982 Yoshida et al.
(Continued)

FOREIGN PATENT DOCUMENTS

DE          938767      *  2/1956
EP       0 985 557 A2     3/2000
(Continued)

OTHER PUBLICATIONS

Machine translation of DE 938767, 1956.*
Extended European Search Report dated Feb. 4, 2016 in Patent Application No. 15163113.2.

*Primary Examiner* — Justin R Fischer
(74) *Attorney, Agent, or Firm* — Oblon, McClelland, Maier & Neustadt, L.L.P.

(57) ABSTRACT

A pneumatic tire includes a tread, a pair of sidewalls extending from edges of the tread substantially in a radially inward direction, a pair of clinches extending from edges of the sidewalls substantially in the radially inward direction, a pair of beads positioned on axially inner sides of the clinches, and a carcass extending along an inner side of the tread and sidewalls such that the carcass is bridging the pair of beads. Each bead includes a fitting portion extending in a circumferential direction and formed to be fitted to a rim, the fitting portion has a bottom surface positioned on a radially inner side of the fitting portion and a side surface positioned on an axially outer side of the fitting portion, the bottom surface includes a heel on the axially outer side of the fitting portion, and the side surface includes a concave extending in the circumferential direction.

20 Claims, 12 Drawing Sheets

(51) Int. Cl.
   *B60C 17/00*      (2006.01)
   *B60C 5/00*       (2006.01)
   *B60C 15/06*      (2006.01)
(52) U.S. Cl.
   CPC .. *B60C 15/0603* (2013.01); *B60C 2015/0614* (2013.01); *Y10T 152/10828* (2015.01)

(56) References Cited

U.S. PATENT DOCUMENTS

| 6,237,661 B1 | 5/2001 | Asano |
| 2004/0187995 A1 | 9/2004 | Yoshinaka |
| 2010/0116391 A1 | 5/2010 | Miyazaki |

FOREIGN PATENT DOCUMENTS

| EP | 1 470 938 A1 | | 10/2004 |
| EP | 2 151 332 A1 | | 2/2010 |
| JP | 2001-146105 A | | 5/2001 |
| JP | 2007-050854 A | | 3/2007 |
| JP | 2010-30527 | * | 2/2010 |

* cited by examiner

PNEUMATIC TIRE

CROSS-REFERENCE TO RELATED APPLICATIONS

The present application is based upon and claims the benefit of priority to Japanese Patent Application No. 2014-094923, filed May 2, 2014, the entire contents of which are incorporated herein by reference.

BACKGROUND OF THE INVENTION

Field of the Invention

The present invention relates to a pneumatic tire.

Description of Background Art

In recent years, run-flat tires having a load-support layer on the inner side of a sidewall have been developed and are gaining popularity. A crosslinked hard rubber is used in the load-support layer. Such a run-flat tire is also referred to as a side-reinforced tire. When the tire is punctured and the inflation pressure is lowered, a run-flat tire is capable of supporting the vehicle weight. A run-flat tire is capable of running for a certain duration even under punctured conditions. JP2007-050854A describes an example of such a run-flat tire. The entire contents of this publication are incorporated herein by reference.

SUMMARY OF THE INVENTION

According to one aspect of the present invention, a pneumatic tire includes a tread, a pair of sidewalls extending from edges of the tread substantially in a radially inward direction, respectively, a pair of clinches extending from edges of the sidewalls substantially in the radially inward direction, respectively, a pair of beads positioned on axially inner sides of the clinches, respectively, and a carcass extending along an inner side of the tread and sidewalls such that the carcass is bridging the pair of beads. Each of the beads includes a fitting portion extending in a circumferential direction and formed to be fitted to a rim, the fitting portion has a bottom surface positioned on a radially inner side of the fitting portion and a side surface positioned on an axially outer side of the fitting portion, the bottom surface of the fitting portion includes a heel on the axially outer side of the fitting portion, the side surface of the fitting portion includes a concave extending in the circumferential direction, the heel of the bottom surface is shaped in a first arc such that the first arc has the center on a first base line and is originating at a first base point, that the heel makes contact with the side surface at the first base point, that the concave of the side surface is recessed from the second base line in an axially inward direction, and that an axial distance from the first base point to the bottom of the concave is in a range of from 1.0 mm to 2.0 mm, where in a cross section perpendicular with respect to the circumferential direction, the first base point is an axially outer edge of the bottom surface, the first base line is a virtual straight line passing through the first base point and extending in an axial direction, and the second base line is a virtual straight line passing through the first base point and extending in a radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
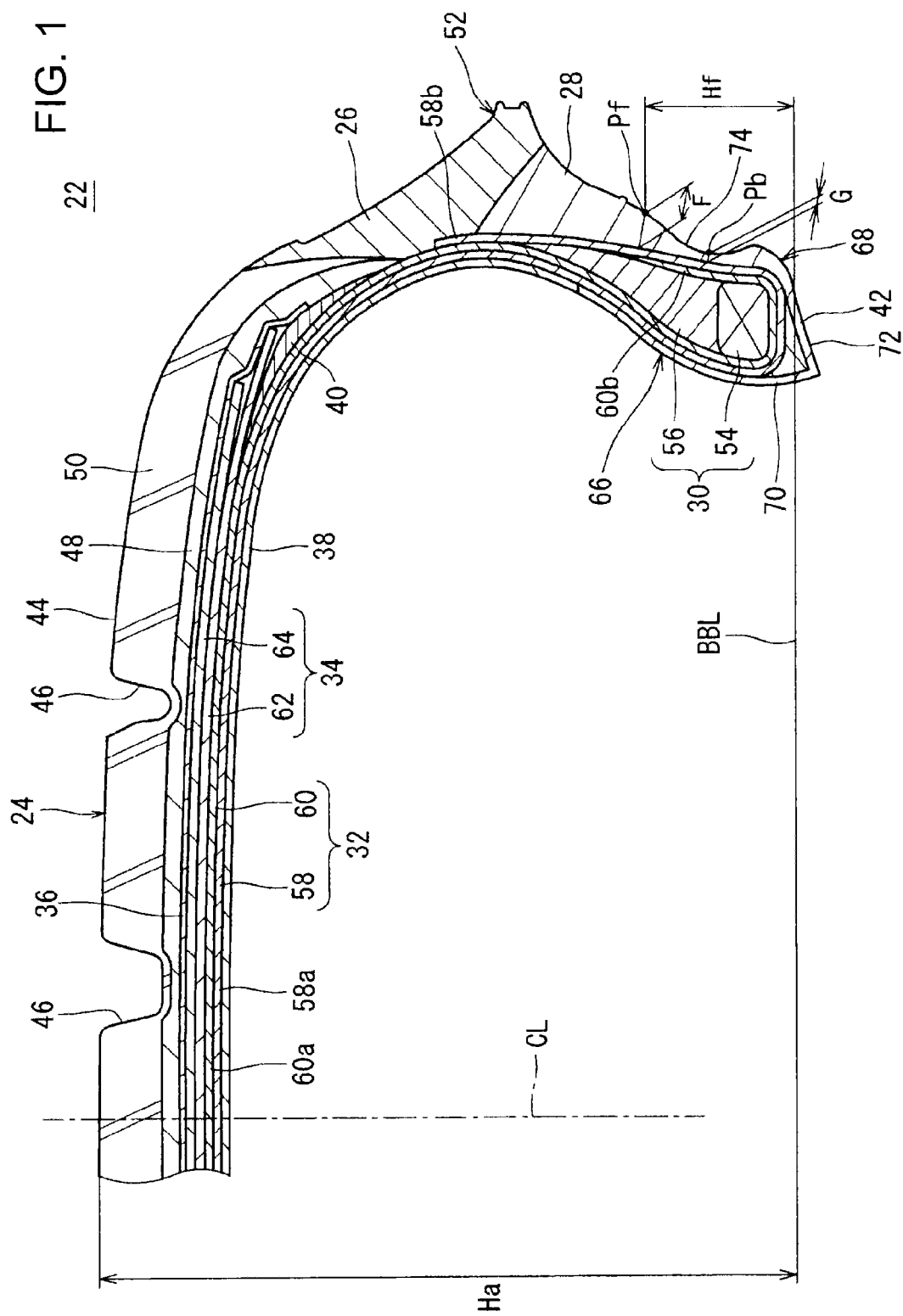
FIG. 1 is a cross-sectional view showing part of a pneumatic tire according to an embodiment of the present invention.

The embodiments will now be described with reference to the accompanying drawings, wherein like reference numerals designate corresponding or identical elements throughout the various drawings.

FIG. 1 shows pneumatic tire 22. FIG. 1 shows part of a cross section perpendicular with respect to a circumferential direction of tire 22. In FIG. 1, the vertical directions correspond to radial directions of tire 22 and the horizontal directions correspond to axial directions of tire 22. Directions perpendicular to the drawing sheet correspond to circumferential directions of tire 22. In FIG. 1, chain line (CL) indicates the equatorial plane of tire 22. Except for tread patterns, the shape of tire 22 is symmetrical to the equatorial plane.

Tire 22 is provided with tread 24, sidewall 26, clinch 28, bead 30, carcass 32, belt 34, band 36, inner liner 38, cushion layer 40 and chafer 42. Tire 22 is a tubeless tire. Tire 22 is for a four-wheel vehicle, more specifically, for a passenger car.

Tread 24 is formed in a shape protruding in a radially outward direction. Tread 24 forms tread surface 44 which makes contact with the ground. Grooves 46 are formed on tread surface 44. Grooves 46 make tread patterns. Tread 24 includes base layer 48 and cap layer 50. Cap layer 50 is positioned on the radially outer side of base layer 48. Cap layer 50 is laminated on base layer 48. Base layer 48 is made of a crosslinked rubber with excellent adhesiveness. A typical rubber material for base layer 48 is a natural rubber. Cap layer 50 is made of a crosslinked rubber that provides excellent wear resistance, heat resistance and grip performance.

Sidewall 26 extends from an edge of tread 24 in an approximately radially inward direction. The radially outer edge of sidewall 26 is bonded to tread 24. The radially inner edge of sidewall 26 is bonded to clinch 28. Sidewall 26 is made of a crosslinked rubber that exhibits excellent cut resistance and weatherability. Sidewall 26 prevents damage to carcass 32. Sidewall 26 has rib 52. Rib 52 protrudes in an axially outward direction. Rib 52 prevents damage to the flange of a rim to which tire 22 is mounted.

Clinch 28 is positioned on the approximately radially inner side of sidewall 26. Clinch 28 is positioned on the axially outer side of bead 30 and carcass 32. Clinch 28 is made of a crosslinked rubber with excellent wear resistance. Cling 28 abuts the flange of a rim.

Bead 30 is positioned on the axially inner side of clinch 28. Bead 30 has core 54 and apex 56 extending from core 54 in a radially outward direction. Core 54 is formed in a ring shape, and includes a non-stretchable wound wire. A typical material for such a wire is steel. Apex 56 tapers in a radially outward direction. Apex 56 is made of a crosslinked hard rubber.

Carcass 32 is made up of first ply 58 and second ply 60. First ply 58 and second ply 60 are formed to extend along tread 24 and sidewall 26 to bridge beads 30 on both sides. First ply 58 is turned up around core 54 from the axially inner side toward the outer side. Such a turn-up structure divides first ply 58 into main portion (58a) and turn-up portion (58b). Second ply 60 is turned up around core 54 from the axially inner side toward the outer side. Such a turn-up structure divides second ply 60 into main portion (60a) and second portion (60b). The edge of turn-up portion (58b) of first ply 58 is positioned on the radially outer side of the edge of turn-up portion (60b) of second ply 60.

First ply 58 and second ply 60 are each made of numerous cords arranged parallel to each other and of topping rubber. The absolute values of angles each cord makes with respect to the equatorial plane are 75~90 degrees. In other words, carcass 32 has a radial structure. The cords are made of organic fibers. Preferred examples of organic fibers are polyester fibers, nylon fibers, rayon fibers, polyethylene naphthalate fibers and aramid fibers. It is an option for carcass 32 to have only one ply.

Belt 34 is positioned on the radially inner side of tread 24. Belt 34 is laminated on carcass 32. Belt 34 reinforces carcass 32. Belt 34 is made up of inner layer 62 and outer layer 64. As seen in FIG. 1, the width of inner layer 62 in an axial direction is slightly greater than that of outer layer 64. Although not shown in FIG. 1, inner layer 62 and outer layer 64 are each formed with numerous cords arranged parallel to each other and a topping rubber. Each cord inclines to the equatorial plane. The absolute values of inclination angles are usually in a range of 10 to 35 degrees. With respect to the equatorial plane, the inclination direction of the cords of inner layer 62 is opposite the inclination direction of the cords of outer layer 64. Preferred material for those cords is steel. Organic fibers may also be used for cords. The axial width of belt 34 is preferred to be at least 0.7 times the maximum width of tire 22. It is an option for belt 34 to have three or more layers.

Band 36 is positioned on the radially outer side of belt 34. In an axial direction, the width of band 36 is greater than the width of belt 34. Although not shown in the drawing, band 36 is made of cords and a topping rubber. The cords are helically wound. Band 36 has a so-called jointless structure. Cords extend substantially in a circumferential direction. The angles of cords with respect to a circumferential direction are no greater than 5 degrees, preferably no greater than 2 degrees. The cords bind belt 34, thus suppressing the lifting of belt 34. The cords are made of organic fibers. Preferred organic fibers are nylon fibers, polyester fibers, rayon fibers, polyethylene naphthalate fibers, and aramid fibers.

Belt 34 and band 36 work as the reinforcement layer. The reinforcement layer may be formed only with belt 34. Alternatively, the reinforcement layer may be formed only with band 36.

Inner liner 38 is positioned on the inner side of carcass 32. Inner liner 38 is bonded to the internal surface of carcass 32. Inner liner 38 is made of a crosslinked rubber. A rubber with excellent air impermeability is used for inner liner 38. A typical rubber material for inner liner 38 is a butyl rubber or a halogenated butyl rubber. Inner liner 38 maintains the inflation pressure of tire 22.

Cushion layer 40 is laminated on carcass 32 near the edge of belt 34. Cushion layer 40 is made of a crosslinked soft rubber. Cushion layer 40 absorbs stress at the edge of belt 34. Cushion layer 40 suppresses the lifting of belt 34.

Chafer 42 is positioned near bead 30. When tire 22 is mounted on a rim, chafer 42 abuts the rim. The abutted chafer protects the vicinity of bead 30 from damage. In the present embodiment, chafer 42 is integrated with clinch 28. Accordingly, the material for chafer 42 is the same as that for clinch 28. Chafer 42 may also be made of a rubber-impregnated cloth.

Bead 30 extends in a circumferential direction of tire 22. When tire 22 is mounted on a rim, a portion of bead 30 is fitted to the rim. The portion of bead 30 in tire 22 extends in a circumferential direction to form fitting portion 66 to be fitted to a rim. External surface 68 of fitting portion 66 faces a rim when it is fitted to the rim. External surface 68 is part of the external surface of tire 22. Internal surface 70 of fitting portion 66 is part of the internal surface of tire 22.

Fitting portion 66 of tire 22 has bottom surface 72 and side surface 74. Bottom surface 72 is positioned on the radially inner side of fitting portion 66. Side surface 74 is positioned on the axially outer side of fitting portion 66. Side surface 74 is positioned on the radially outer side of bottom surface 72.

Figure 2:
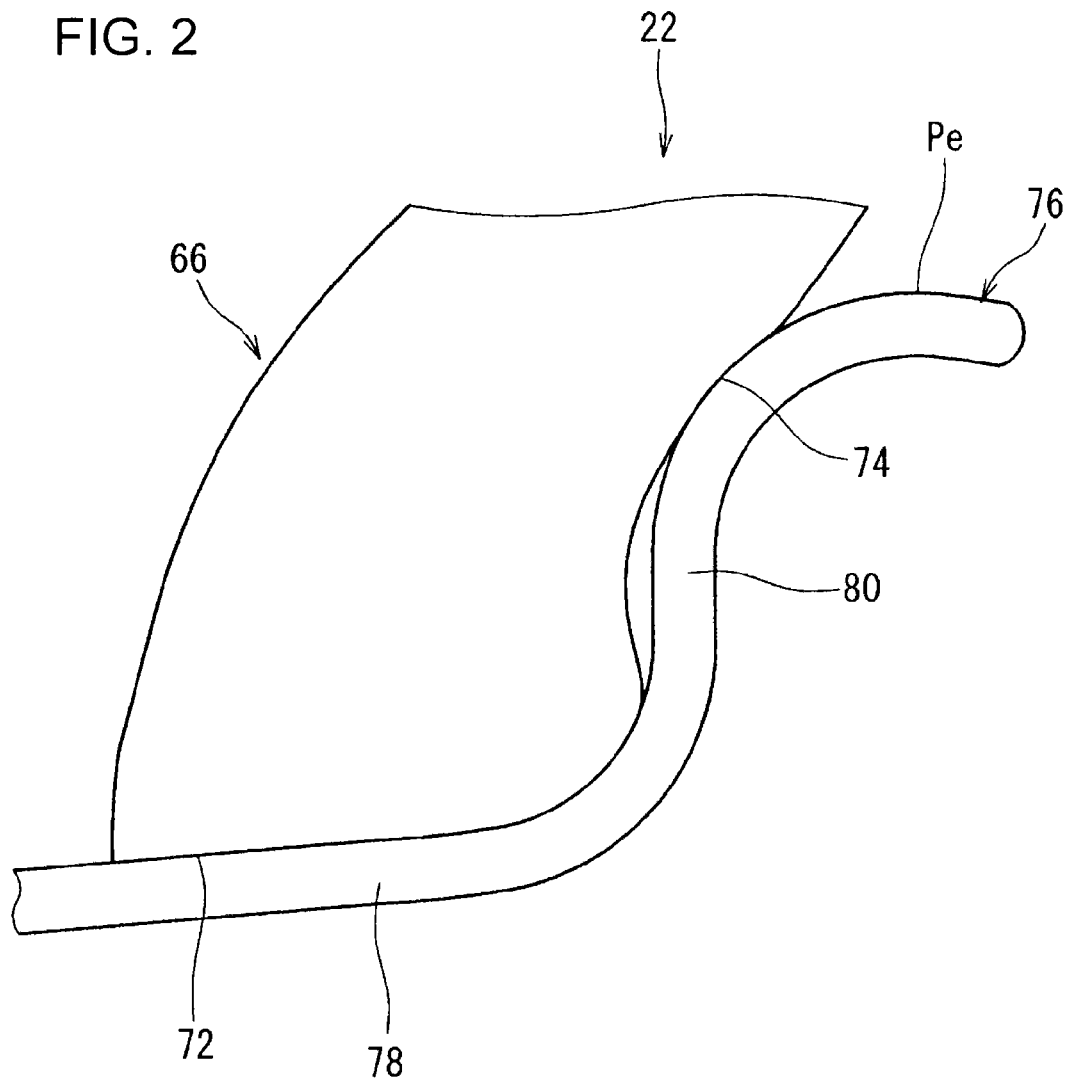
FIG. 2 is a cross-sectional view showing when the tire in FIG. 1 is in use.

FIG. 2 shows a state where fitting portion 66 of tire 22 is fitted to rim 76. In FIG. 2, vertical directions correspond to radial directions of tire 22, and horizontal directions correspond to axial directions of tire 22, and directions perpendicular to the drawing sheet correspond to circumferential directions of tire 22.

Rim 76 has axially extending seat 78, and flange 80 extending from seat 78 in a radially outward direction. When tire 22 is mounted on rim 76, bottom surface 72 of fitting portion 66 makes contact mainly with seat 78, and side surface 74 of fitting portion 66 makes contact mainly with flange 80 as shown in FIG. 2. In the present application, rim 76 is a normal rim. A normal rim indicates a rim specified in the regulations that include standards for tire 22: it is specified as a "Normal Rim" by JATMA regulations, "Design Rim" by TRA regulations, and "Measuring Rim" by ETRTO regulations.

Tire 22 is manufactured as follows. Although not shown in the drawings, tire members such as tread 24 and sidewall 26 are assembled on the drum of a tire former when tire 22 is manufactured. As a result, a raw cover of a tire is obtained. A raw cover is an unvulcanized tire 22. The process for assembling a raw cover is also referred to as a molding process.

A raw cover is placed in a mold. At that time, a bladder is positioned on the inner side of the raw cover. When a gas is filled, the bladder expands. Accordingly, the raw cover deforms. The mold is tightened and the inflation pressure of the bladder is increased. Instead of a bladder, a core may also be used. A core is formed to have a toroidal external shape. Such an external shape is approximated to be the shape of the internal surface of tire 22, in a state when air is filled to have an inflation pressure at 5% of the normal inflation pressure.

Figure 3:
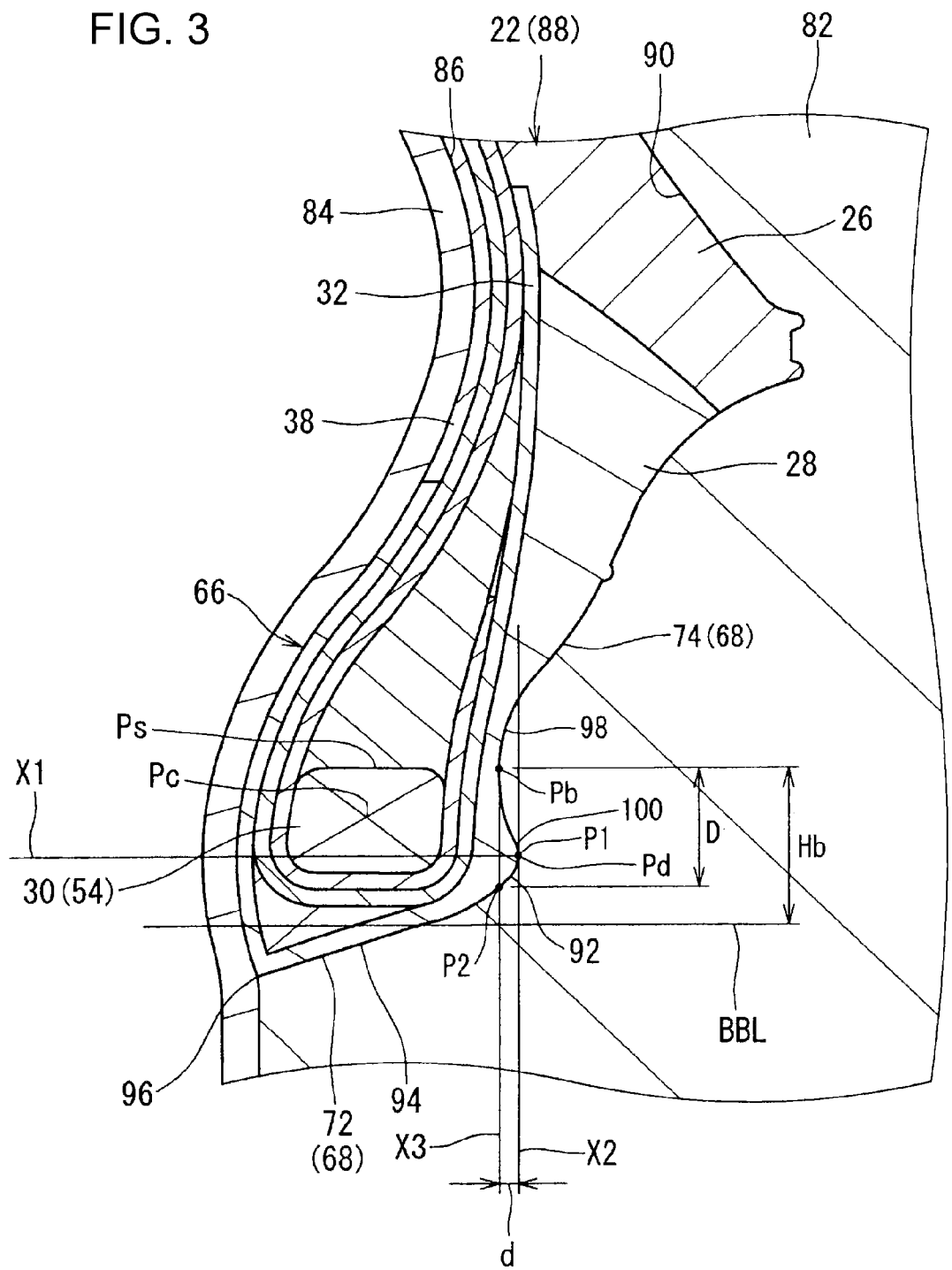
FIG. 3 is a cross-sectional view showing a manufacturing process for the tire in FIG. 1.

FIG. 3 shows mold 82 and bladder 84 along with part of the cross section of tire 22 shown in FIG. 1. FIG. 3 shows that raw cover 88 that is placed into cavity 86 formed between mold 82 and bladder 84. In FIG. 3, vertical directions correspond to radial directions of tire 22, horizontal directions correspond to axial directions of tire 22, and directions perpendicular to the drawing sheet correspond to circumferential directions of tire 22.

As illustrated, when mold 82 is tightened, pressure is applied on raw cover 88 to sandwich it between mold 82 and bladder 84. Raw cover 88 is heated by thermal conduction from mold 82 and bladder 84. The rubber composition of raw cover 88 flows as a result of pressure and heat applied thereto. When heat is applied, the rubber composition undergoes crosslinking reactions, resulting in tire 22 shown in FIG. 1. The process to apply pressure and heat to raw cover 88 is also referred to as a crosslinking process.

In the crosslinking process, expanded bladder 84 presses raw cover 88 against cavity surface 90 of mold 82. The rubber flows into cavity surface 90. Accordingly, the external surface of tire 22 is formed. The external surface includes grooves 46 on aforementioned tread surface 44. When markings such as characters and codes are formed on sidewall 26, those markings are also included in the external surface.

In an embodiment of the present invention, the external outline of tire 22 is determined based on cavity surface 90 of mold 82 unless otherwise specified. When grooves 46 are formed on tread surface 44, which is part of the external surface, the outline is shown using a virtual tread surface obtained by assuming there are no grooves 46. When markings are formed on sidewall 26, the outline is shown using a virtual external surface of sidewall 26 obtained by assuming there are no such markings. When markings are formed on fitting portion 66, the outline is shown using a virtual external surface of fitting portion 66 obtained by assuming there are no such markings.

As described above, fitting portion 66 of tire 22 has bottom surface 72 and side surface 74. Bottom surface 72 and side surface 74 form external surface 68 of fitting portion 66.

In tire 22, bottom surface 72 includes heel 92 on its axially outer side. Heel 92 is shaped in an arc as described later. Mark (P1) denotes an axially outer edge of heel 92. In tire 22, axially outer edge (P1) of heel 92 is the axially outer edge of bottom surface 72. Bottom surface 72 is further provided with seat surface 94. Seat surface 94 is positioned on the axially inner side of heel 92. Seat surface 94 extends from toe 96 of fitting portion 66 in an axially outward direction while inclining in a radially outward direction.

In tire 22, side surface 74 includes concave 98. Concave 98 is shaped to protrude in an axially inward direction. Concave 98 extends in a circumferential direction. Concave 98 is positioned on the axially outer side of bead 30 in tire 22.

In tire 22, it is sufficient for concave 98 to protrude in an axially inward direction. Its shape is not limited specifically. Thus, the outline of concave 98 in tire 22 may be shaped using a single arc. Alternatively, the outline of concave 98 may be shaped using multiple arcs. The outline of concave 98 may also be shaped using one or multiple straight lines and arcs.

As described above, mark (P1) in FIG. 3 denotes the axially outer edge of bottom surface 72. In the present application, outer edge (P1) is also referred to as the first base point. Solid line (X1) is a virtual straight line that passes through first base point (P1) and extends in an axial direction. In the present application, virtual straight line (X1) is also referred to as the first base line. Solid line (X2) is a virtual straight line that passes through first base point (P1) and extends in a radial direction. In the present application, virtual straight line (X2) is also referred to as the second base line.

As described above, side surface 74 of fitting portion 66 of tire 22 includes concave 98 that extends in a circumferential direction. When tire 22 is fitted to rim 76, concave 98 faces flange 80 of rim 76. As illustrated, concave 98 is recessed from second base line (X2) in an axially inward direction. Thus, when tire 22 is fitted to rim 76, fitting portion 66 bends originating at concave 98 and causes portions on the radially outer side of concave 98 to extend in an axially outward direction. As a result, fitting portion 66 is supported by rim 76 mainly at portions on the radially outer side of concave 98 and at portions on the radially inner side of concave 98. Fitting portion 66 of tire 22 is fixed to rim 76 because rim 76 is sandwiched between portions on the radially outer side of concave 98 and portions on the radially inner side of concave 98. Fitting portion 66 of tire 22 is less likely to move relative to rim 76. Fitting portion 66 is less likely to be damaged. Tire 22 exhibits excellent durability. Since driving force is effectively transmitted from the vehicle to the ground and from the ground to the vehicle, tire 22 exhibits excellent steering stability.

In tire 22, heel 92 of fitting portion 66 is shaped in an arc having its center positioned on first base line (X1) and originating at first base point (P1). Since heel 92 is shaped in an arc, fitting portion 66 makes tight contact with rim 76 when tire 22 is fitted to rim 76. The arc that shapes heel 92 is also referred to as a first arc.

In FIG. 3, mark (Pd) denotes the radially inner edge of concave 98. In tire 22, inner edge (Pd) is the radially inner edge of side surface 74. Side surface 74 in tire 22 may include a plane that connects inner edge (Pd) and axially outer edge (P1) of bottom surface 72. In such a case, the radially inner edge of the plane is the radially inner edge of side surface 74. The pressure generated when fitting portion 66 touches rim 76 affects the movement of fitting portion 66 relative to rim 76. A smaller contact area results in greater contact pressure. Greater contact pressure suppresses the movement of fitting portion 66 relative to rim 76. To obtain a smaller contact area, the outline of side surface 74 is preferred to be formed in such a way that radially inner edge (Pd) of concave 98 corresponds to the radially inner edge of side surface 74 as structured in tire 22.

In tire 22, the radially inner portion of concave 98, namely, hem 100 of concave 98, is shaped in an arc having its center on the axially inner side of side surface 74. Hem 100 may also be shaped in an arc having its center on the axially outer side of side surface 74. Alternatively, hem 100 may be shaped in a straight line extending while inclining in a radial direction. From a viewpoint of avoiding the formation of an edge that may cause chipping, hem 100 is preferred to be in an arc having its center on the axially inner side of side surface 74. When hem 100 is shaped in an arc, the arc of hem 100 is referred to as a second arc.

In tire 22, heel 92 makes contact with side surface 74 at first base point (P1). Thus, when tire 22 is fitted to rim 76, fitting portion 66 makes tight contact with rim 76. Especially, from a viewpoint of avoiding the formation of an edge that may cause chipping while effectively suppressing the movement of fitting portion 66 relative to rim 76, it is preferred in tire 22 that the outline of side surface 74 be formed in such a way that radially inner edge (Pd) of concave 98 corresponds to the radially inner edge of side surface 74, and hem 100 of concave 98 be shaped in an arc having its center on the axially inner side of side surface 74. In other words, concave 98 of side surface 74 is preferred to make contact with heel 92 at first base point (P1) and to include the arc having its center on the inner side of side surface 74.

In FIG. 3, mark (Pb) denotes the axially innermost point of concave 98. Point (Pb) is the bottom of concave 98 in the present application. When the outline of bottom (Pb) is formed as a radially extending straight line, the radially inner edge of the straight line is set as bottom (Pb). Solid line (X3) is a virtual straight line that passes through bottom (Pb) of concave 98 and extends in a radial direction. Virtual straight line (X3) is also referred to as a third base line in the present application. Double-headed arrow (d) indicates an axial distance from second base line (X2) to third base line (X3). Distance (d) is an axial distance from first base point (P1) to the bottom (Pb) of concave 98. Distance (d) corresponds to the depth of concave 98.

Distance (d) is at least 1.0 mm but no greater than 2.0 mm in tire 22. By setting distance (d) to be at least 1.0 mm, concave 98 contributes effectively to the bending of fitting portion 66. Since fitting portion 66 is suppressed from moving relative to rim 76, fitting portion 66 is less likely to be damaged. Tire 22 exhibits excellent durability. Since driving force is effectively transmitted from the vehicle to the ground and from the ground to the vehicle, tire 22 exhibits excellent steering stability. From those viewpoints, distance (d) is preferred to be at least 1.2 mm. When distance (d) is set below 2.0 mm, the thickness of the clinch at bottom (Pb) of concave 98 is appropriately maintained. Since the rubber positioned outside the cords contained in carcass 32 has a sufficient thickness where concave 98 is present in tire 22, the cords are prevented from being exposed. From such a viewpoint, distance (d) is preferred to be 1.5 mm or less.

In FIG. 3, solid line (BBL) indicates the bead base line. The bead base line corresponds to a line that specifies the rim diameter of rim 76 on which to mount tire 22 (see JATMA). The bead base line extends in an axial direction. Double-headed arrow (Hb) shows the radial height from the bead base line to the bottom (Pb) of concave 98. Mark (Pc) denotes the center of core 54 of bead 30. Mark (Ps) denotes the radially outer edge of core 54.

In tire 22, height (Hb) is preferred to be 20 mm or less. By so setting, portions on the radially outer side of concave 98 and portions on the radially inner side of concave 98 sandwich rim 76 so that fitting portion 66 is fixed to rim 76. Fitting portion 66 is less likely to move relative to rim 76. Tire 22 exhibits excellent durability and steering stability. From those viewpoints, height (Hb) is more preferably 17 mm or less, and is especially preferably 15 mm or less.

Height (Hb) is preferred to be at least 5 mm in tire 22. By so setting, concave 98 contributes effectively to the bending of fitting portion 66. In such a case as well, fitting portion 66 is suppressed from moving relative to rim 76. Tire 22 exhibits excellent durability and steering stability. From such viewpoints, height (Hb) is more preferably at least 6 mm, and is especially preferably at least 8 mm.

As described above, core 54 of bead 30 in tire 22 includes a wound non-stretchable wire. Core 54 is made hard. Hard core 54 has an impact on the bending of fitting portion 66 that originates at concave 98. Since concave 98 effectively contributes to the bending of fitting portion 66, bottom (Pb) of concave 98 is preferred to be positioned on the radially outer side of center (Pc) of core 54 in tire 22. Bottom (Pb) is more preferred to be positioned on the radially outer side of radially outer edge (Ps) of core 54. Tire 22 exhibits excellent durability and steering stability.

In FIG. 3, mark (P2) denotes the intersection of third base line (X3) and bottom surface 72 of fitting portion 66. In the present application, intersection (P2) is also referred to as the second base point. Double-headed arrow (D) indicates the radial distance from second base point (P2) to the bottom (Pb) of concave 98.

The depth of concave 98 and the position of the bottom (Pb) of concave 98 affect the ease and degree of the bending of fitting portion 66. Considering the function of concave 98 that contributes effectively to the bending of fitting portion 66, the ratio of distance (d) to distance (D) is preferred to be in a range of 0.1 to 0.5. By so setting, fitting portion 66 is effectively suppressed from moving relative to rim 76 in tire 22. Tire 22 exhibits excellent durability and steering stability.

In tire 22, distance (D) is preferred to be 15 mm or less. By so setting, portions on the radially outer side of concave 98 and portions on the radially inner side of concave 98 sandwich rim 76 so that fitting portion 66 is fixed to rim 76. Fitting portion 66 is less likely to move relative to rim 76. Fitting portion 66, as it is suppressed from moving relative to rim 76, contributes to the durability and steering stability of tire 22. In tire 22, distance (D) is preferred to be at least 5 mm. By so setting, concave 98 works effectively as the bending starting point of fitting portion 66. In such a case as well, fitting portion 66 is less likely to move relative to rim 76. Tire 22 exhibits excellent durability and steering stability.

Figure 4:
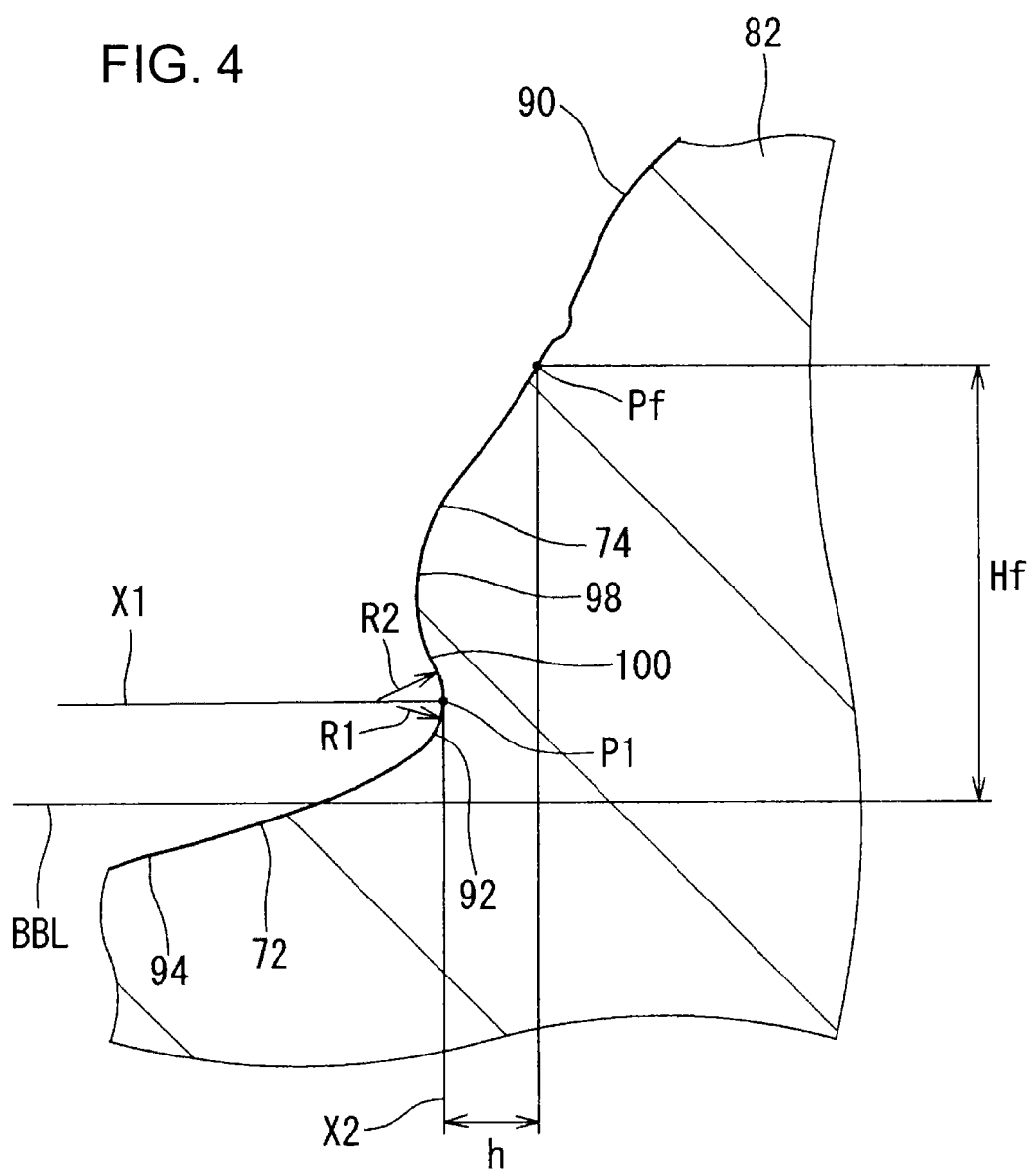
FIG. 4 is a cross-sectional view showing the mold in FIG. 3.

FIG. 4 shows part of mold 82 shown in FIG. 3. Cavity surface 90 of mold 82 in FIG. 4 corresponds to external surface 68 of fitting portion 66 in tire 22. In FIG. 4, the vertical directions correspond to radial directions of tire 22, the horizontal directions correspond to axial directions of tire 22, and directions perpendicular to the drawing sheet correspond to circumferential directions of tire 22.

In FIG. 4, mark (R1) denotes the curvature radius of the first arc that shapes heel 92. Mark (R2) denotes the curvature radius of the second arc that shapes hem 100 of concave 98. As described above, solid line (X1) is the first base line, which passes through first base point (P1) and extends in an axial direction.

As described above, heel 92 shaped in an arc contributes to having fitting portion 66 make tight contact with rim 76. For fitting portion 66 to make tight contact with rim 76, curvature radius (R1) is preferred to be at least 2 mm but no greater than 10 mm.

In tire 22, curvature radius (R2) of the second arc is preferred to be 11 mm or less. By so setting, hem 100 of concave 98 contributes to generating greater contact pressure. Fitting portion 66 of tire 22 is less likely to move relative to rim 76. Fitting portion 66, as it is suppressed from moving relative to rim 76, contributes to the durability and steering stability of tire 22. From such viewpoints, curvature radius (R2) is more preferably 8 mm or less, even more preferably 4 mm or less and especially preferably 3 mm or less. From the viewpoint of preventing formation of an edge that may cause chipping, curvature radius (R2) is preferred to be at least 1 mm, more preferably at least 2 mm.

In FIG. 4, solid line (BBL) indicates the bead base line. Mark (Pf) denotes a point on cavity surface 90 that corresponds to a point on the external surface of tire 22 where radial height (Hf) from the bead base line is 20 mm. Double-headed arrow (h) indicates the axial distance from first base point (P1) to point (Pf). Distance (h) is measured based on cavity surface 90 of mold 82.

In tire 22, distance (h) is preferred to be at least 3.5 mm but no greater than 5.0 mm. When distance (h) is at least 3.5 mm, portions on the radially outer side of concave 98 and portions on the radially inner side of concave 98 sandwich rim 76 so that fitting portion 66 is fixed to rim 76. Fitting portion 66 is less likely to move relative to rim 76. Tire 22 exhibits excellent durability and steering stability. From such viewpoints, distance (h) is more preferably 4.0 mm or greater. When distance (h) is 5.0 mm or less, the rigidity of fitting portion 66 is appropriately maintained. Tire 22 exhibits excellent riding comfort. From those viewpoints, distance (h) is more preferably 4.7 mm or less.

In FIG. 1, solid line (BBL) indicates the bead base line. As described above, (P0) indicates the point on the external surface of tire 22 where radial height (Hf) from the bead base line is 20 mm. Double-headed arrow (F) indicates the thickness from carcass 32 to point (Pf). Double-headed arrow (G) indicates the thickness from carcass 32 to bottom (Pb) of concave 98. Double-headed arrow (Ha) indicates the radial height from the bead base line to the equator of tire 22. Height (Ha) is the cross-sectional height of tire 22. Thicknesses (F, G) are measured along a normal line to the external surface of carcass 32 in a cross section shown in FIG. 1 when tire 22 is not mounted on rim 76. Height (Hf) and cross-sectional height (Ha) are measured based on cavity surface 90 of mold 82.

In tire 22, the ratio of thickness (F) to thickness (G) is preferred to be in a range of 2.3 to 3.3. When the ratio is 2.3 or greater, significant collapse of fitting portion 66 is prevented. Accordingly, fitting portion 66 is effectively suppressed from moving relative to rim 76. Tire 22 exhibits excellent durability and steering stability. When the ratio is 3.3 or lower, the rigidity of fitting portion 66 is appropriately maintained. Tire 22 exhibits excellent riding comfort.

In tire 22, cross-sectional height (Ha) is preferred to be 125 mm or less. By so setting, sidewall 26 is less likely to have an impact on the collapse of fitting portion 66. Since the movement of fitting portion 66 relative to rim 76 is effectively suppressed, tire 22 exhibits excellent durability and steering stability. Height (Ha) is preferred to be at least 80 mm in tire 22. Fitting portion 66 will have an appropriate outline.

Figure 5:
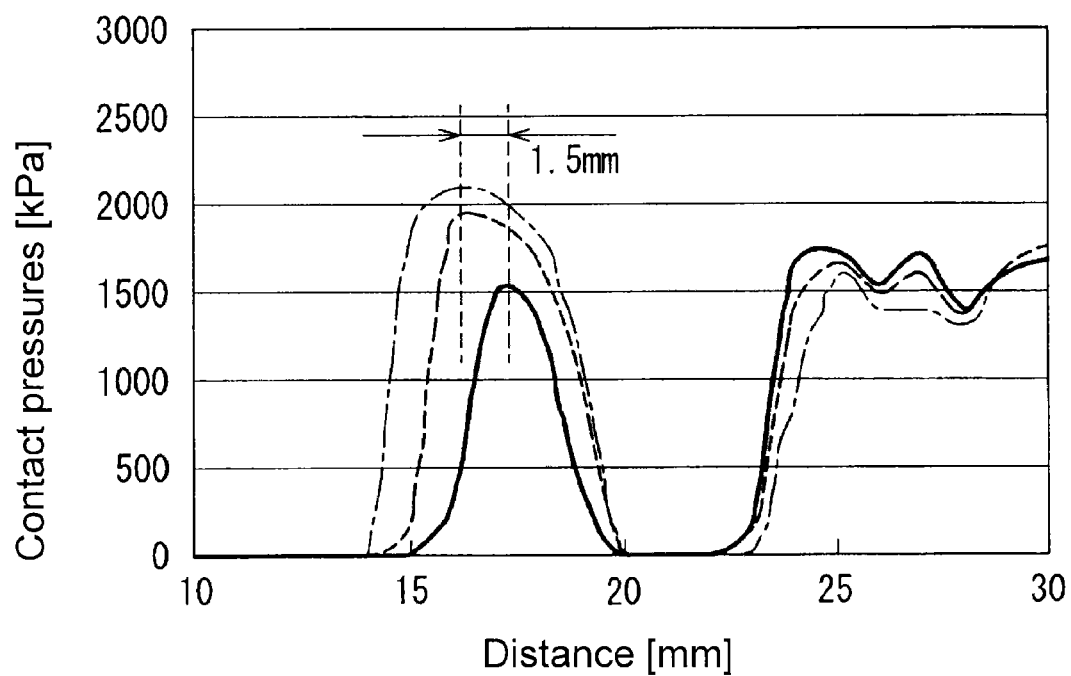
FIG. 5 is a graph showing the results of measuring contact pressures on the tire shown in FIG. 1.

FIG. 5 is a graph showing the results of measuring contact pressures on tire 22. When the radial outer edge (Pe in FIG. 2) of flange 80 is set as a base point, FIG. 5 shows the relationship between the contact pressure and the distance from the base point. In FIG. 5, the horizontal axis indicates distances from the base point, and the vertical axis indicates contact pressures. The solid line shows results obtained by measuring with no load applied on the tire. The broken line shows results obtained by measuring when a load is applied vertically on tire 22 (longitudinal load). The chain line shows results when a load is applied horizontally on tire 22 (lateral load) while maintaining the longitudinal load. Contact pressure was measured by inserting a pressure-sensitive plate (not shown) between tire 22 (size=225/40R18) and rim 76 (size=18×8.0J). When contact pressure was measured, air was filled in tire 22 at an inflation pressure of 250 kPa. Longitudinal and lateral loads are equal to those employed to obtain the measurement results shown in FIG. 12.

As shown in FIG. 5, the difference between the peak contact-pressure position when a load is applied and the peak contact-pressure position when no load is applied, namely, the shifted amount, is 1.5 mm in tire 22. The value is smaller than the shifted amount (4.6 mm) of a conventional tire 2. It is found that the movement of fitting portion 66 relative to rim 76 is suppressed in tire 22, compared with conventional tire 2. Fitting portion 66 of tire 22 is less likely to be damaged than fitting portion 10 of conventional tire 2. Tire 22 exhibits excellent durability. Since driving force is effectively transmitted from the vehicle to the ground and from the ground to the vehicle, tire 22 exhibits excellent steering stability.

Tire 22 can be used for front and rear wheels of a four-wheel vehicle. When the steering wheel is turned, the front wheels of a four-wheel vehicle incline to the direction of travel. As a result, cornering force is generated in tire 22, allowing the four-wheel vehicle to turn. At that time, force is applied to tire 22 in an axial direction. When it is a front-wheel-drive four-wheel vehicle, greater force is exerted on the front wheels than on the rear wheels. As described above, since fitting portion 66 is suppressed from moving relative to rim 76, tire 22 is more likely to transmit driving force from the vehicle to the ground, or from the ground to the vehicle, than otherwise. Thus, tire 22 is preferred to be used on a front wheel of a four-wheel vehicle. Tire 22 capable of easily transmitting driving force from the vehicle to the ground and from the ground to the vehicle tends to transmit road noise. Taking into account the riding comfort of a four-wheel vehicle, tire 22 is more preferred to be used only on front wheels.

Unless otherwise specified, dimensions and angles of members of tire 22 are measured under conditions when tire 22 is mounted on a normal rim and air is filled in tire 22 at a normal inflation pressure. At the time of measuring, no load is applied to tire 22. The normal rim in the present application indicates a rim specified in regulations that include standards for tire 22. The normal inflation pressure in the present application indicates an inflation pressure specified in the regulations that include standards for tire 22. It is specified as "Maximum Air Pressure" by JATMA regulations, "the maximum value" listed in "Tire Load Limits at Various Cold Inflation Pressures" by TRA regulations, and "Inflation Pressure" by ETRTO regulations. If it is a passenger tire, dimensions and angles are measured at an inflation pressure of 180 kPa. In the present application, normal load indicates such a load specified in the regulations that include standards for tire 22. It is specified as "Maximum Load Capacity" by JATMA regulations, "the maximum value" listed in "Tire Load Limits at Various Cold Inflation Pressures" by TRA regulations, and "Load Capacity" by ETRTO regulations. The same applies to a run-flat tire described later.

Figure 6:
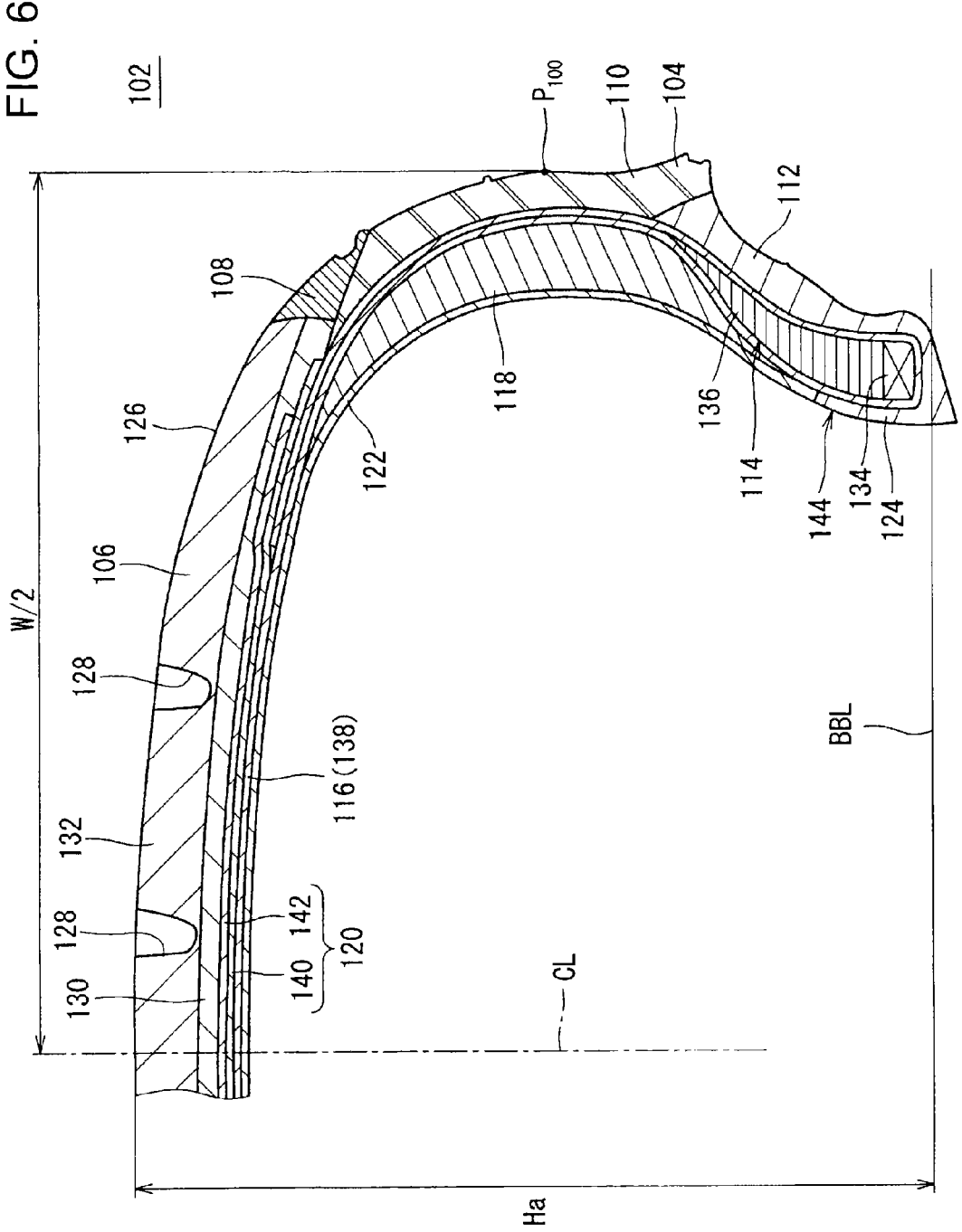
FIG. 6 is a cross-sectional view showing part of a pneumatic tire according to another embodiment of the present invention.

FIG. 6 shows part of pneumatic tire 102 according to another embodiment of the present invention. In FIG. 6, vertical directions correspond to radial directions of tire 102, and horizontal directions correspond to axial directions of tire 102, and directions perpendicular to the drawing sheet correspond to circumferential directions of tire 102. In FIG. 6, chain line (CL) is the equatorial plane of tire 102. The shape of tire 102 is symmetrical to the equatorial plane except for tread patterns.

In FIG. 6, double-headed arrow (Ha) indicates the height of tire 102 from bead base line (BBL). Double-headed arrow (W/2) indicates half of width (W) of tire 102. Width (W) is determined based on point ($P_{100}$) positioned on the outermost side, excluding rib 104.

Tire 102 includes tread 106, wing 108, sidewall 110, clinch 112, bead 114, carcass 116, load-support layer 118, belt 120, inner liner 122 and chafer 124. Tire 102 is a tubeless tire. Tire 102 is mounted on a four-wheel vehicle, more specifically, on a passenger car.

Tread 106 is formed in a shape protruding in a radially outward direction. Tread 106 has tread surface 126 which makes contact with the ground. Grooves 128 are formed on tread surface 126. Tread patterns are formed by grooves 128. Tread 106 is made of base layer 130 and cap layer 132. Base layer 130 is made of the same rubber as used above for base layer 48 of tire 22. Cap layer 132 is made of the same rubber as used above for cap layer 50 of tire 22.

Sidewall 110 extends from an edge of tread 106 in an approximately radially inward direction. Sidewall 110 is made of the same rubber as used above for sidewall 26 of tire 22.

Clinch 112 is positioned on the approximately radially inner side of sidewall 110. Clinch 112 is positioned on the axially outer side of bead 114 and carcass 116. Clinch 112 abuts the flange of a rim. Clinch 112 is made of the same rubber as used above for clinch 28 of tire 22.

Bead 114 is positioned on the axially inner side of clinch 112. Bead 114 has core 134 and apex 136 extending from core 134 in a radially outward direction. Bead 114 is structured the same as bead 30 of tire 22 described above.

Carcass 116 is formed with one ply 138. Ply 138 is formed along the inner side of tread 106 and sidewall 110 to bridge beads 114 on both sides. Ply 138 is turned up around core 134 from the axially inner side toward the outer side. The edge of ply 138 reaches the vicinity of tread 106. Carcass 116 is referred to as a high turn-up structure. Ply 138 has the same structure as employed above for first ply 58 or second ply 60 of carcass 32 of tire 22.

Load-support layer 118 is positioned on the axially inner side of sidewall 110. Load-support layer 118 is sandwiched between carcass 116 and inner liner 122. Load-support layer 118 is shaped like a crescent. The inner edge of load-support layer 118 is positioned on the radially inner side of the outer edge of apex 136. In other words, load-support layer 118 overlaps apex 136. The vicinity of the outer edge of load-support layer 118 overlaps belt 120. Load-support layer 118 is made of a crosslinked hard rubber. When a puncture decreases the inflation pressure of tire 102, load-support layer 118 supports the vehicle weight. Because of load-support layer 118, tire 102 is capable of running a certain distance even when the inflation pressure is low. Tire 102 is a run-flat tire. Run-flat tire 102 is side-reinforced. Tire 102 may also have load-support layer 118 with a shape different from that shown in FIG. 6.

The hardness of load-support layer 118 of tire 102 is preferred to be at least 60 but no greater than 85. When the hardness is at least 60, load-support layer 118 contributes effectively to supporting the vehicle weight when a puncture causes the inflation pressure of tire 102 to be lowered. Thus, the hardness is preferred to be 65 or higher. When the hardness is 85 or lower, load-support layer 118 is less likely to have any impact on the warping of sidewall 110. Tire 102 appropriately maintains riding comfort. From those viewpoints, the hardness is more preferably 80 or lower.

In the present application, hardness indicates a JIS-A hardness. Hardness is measured as specified in "JIS-K6253" at a temperature of 23° C. using a type-A durometer. More specifically, hardness is measured by pressing a type-A durometer against the cross section shown in FIG. 6.

Belt 120 is positioned on the radially inner side of tread 106. Belt 120 is laminated on carcass 116. Belt 120 reinforces carcass 116. Belt 120 is made of inner layer 140 and outer layer 142. Belt 120 has the same structure as employed above for belt 34 of tire 22.

Inner liner 122 forms the internal surface of tire 102. Inner liner 122 works to maintain the inflation pressure of tire 102. Inner liner 122 is made of the same rubber as that used above for inner liner 38 of tire 22.

Chafer 124 is positioned near bead 114. When tire 102 is mounted on a rim, chafer 124 abuts the rim. Such a condition protects the vicinity of bead 114. Chafer 124 is integrated with clinch 112 the same as in chafer 42 of tire 22.

Figure 7:
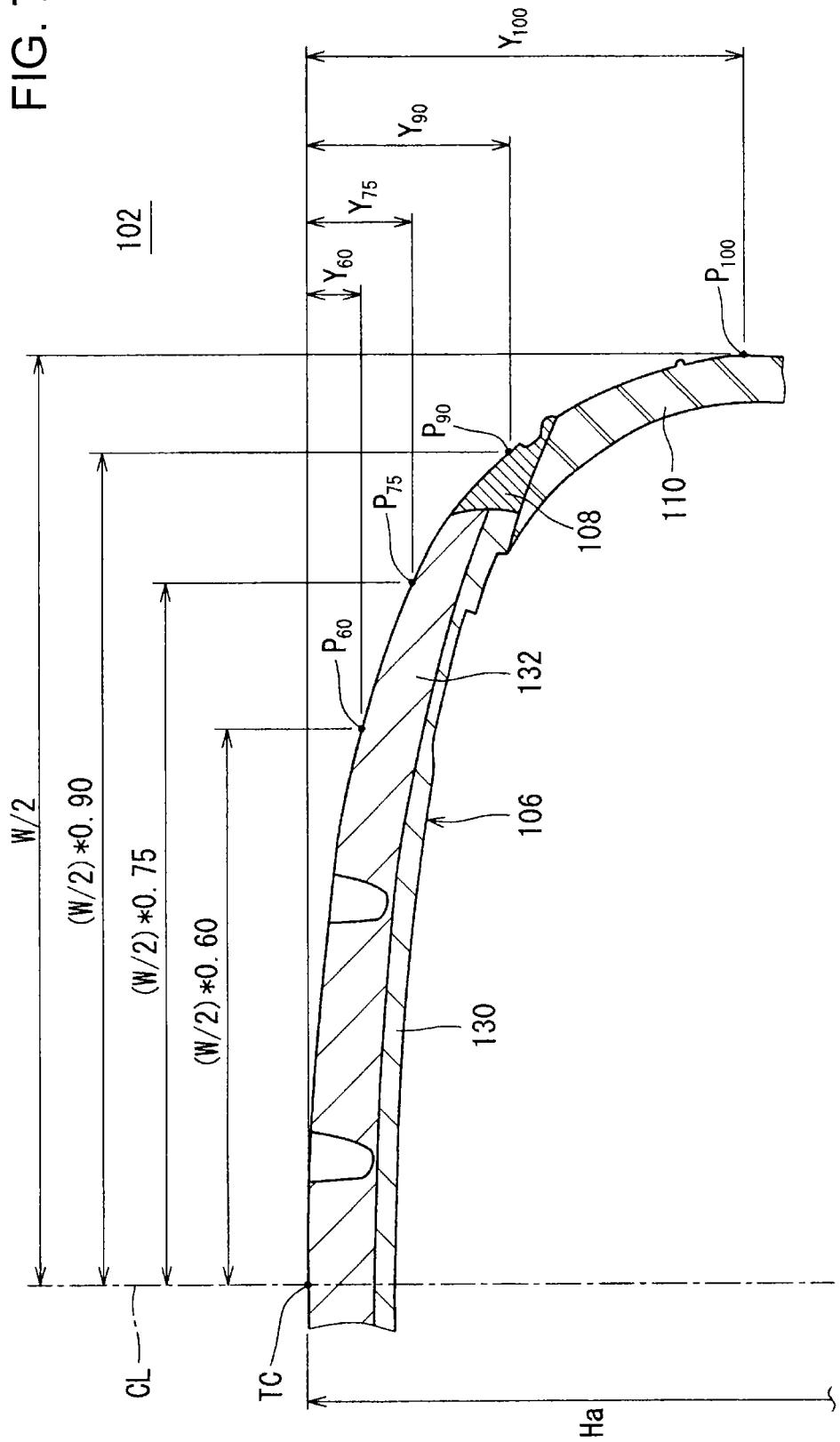
FIG. 7 is a cross-sectional view showing part of the tire in FIG. 6.

FIG. 7 is a cross-sectional view showing part of tire 102 in FIG. 6. FIG. 7 shows tread 106, wing 108 and sidewall 110. The external outline from tread 106 through wing 108 to sidewall 110 is also referred to as a profile. What is denoted in (TC) in FIG. 7 is the intersection of the profile and equator (CL). Point ($P_{100}$) is the outermost point as described above. The profile extends from point (TC) to point ($P_{100}$).

Tire 102 has a CTT profile. In a CTT profile, the curvature radius decreases gradually from point (TC) to point ($P_{100}$). Typically, a CTT profile is determined based on an involute curve. A CTT profile may also be structured with numerous arcs approximated to an involute curve. A CTT profile may also be determined based on other functional curves.

In FIG. 7, point ($P_{60}$) indicates a point on the profile where the axial distance from point (TC) is 60% of half the width (W/2) of tire 102. Also, point ($P_{75}$) indicates a point on the profile where the axial distance from point (TC) is 75% of half the width (W/2) of tire 102, and point ($P_{90}$) indicates a point on the profile where the axial distance from point (TC) is 90% of half the width (W/2) of tire 102. In FIG. 7, ($Y_{60}$) indicates the radial distance between point (TC) and point ($P_{60}$), ($Y_{75}$) indicates the radial distance between point (TC) and point ($P_{75}$), ($Y_{90}$) indicates the radial distance between point (TC) and point ($P_{90}$), and ($Y_{100}$) indicates the radial distance between point (TC) and point ($P_{100}$). The CTT profile satisfies formulas (1)~(4) below.

$$0.05 < Y_{60}/Ha \leq 0.10 \quad (1)$$

$$0.10 < Y_{75}/Ha \leq 0.2 \quad (2)$$

$$0.2 < Y_{90}/Ha \leq 0.4 \quad (3)$$

$$0.4 < Y_{100}/Ha \leq 0.7 \quad (4)$$

The CTT profile contributes to various properties of tire 102.

The external surface of tire 102 is formed by pressing a raw cover against the cavity surface of a mold in a vulcanization process, the same as in tire 22 shown in FIG. 1. The external outline of tire 102 shown in FIG. 6 corresponds to the cavity surface of a mold.

Figure 8:
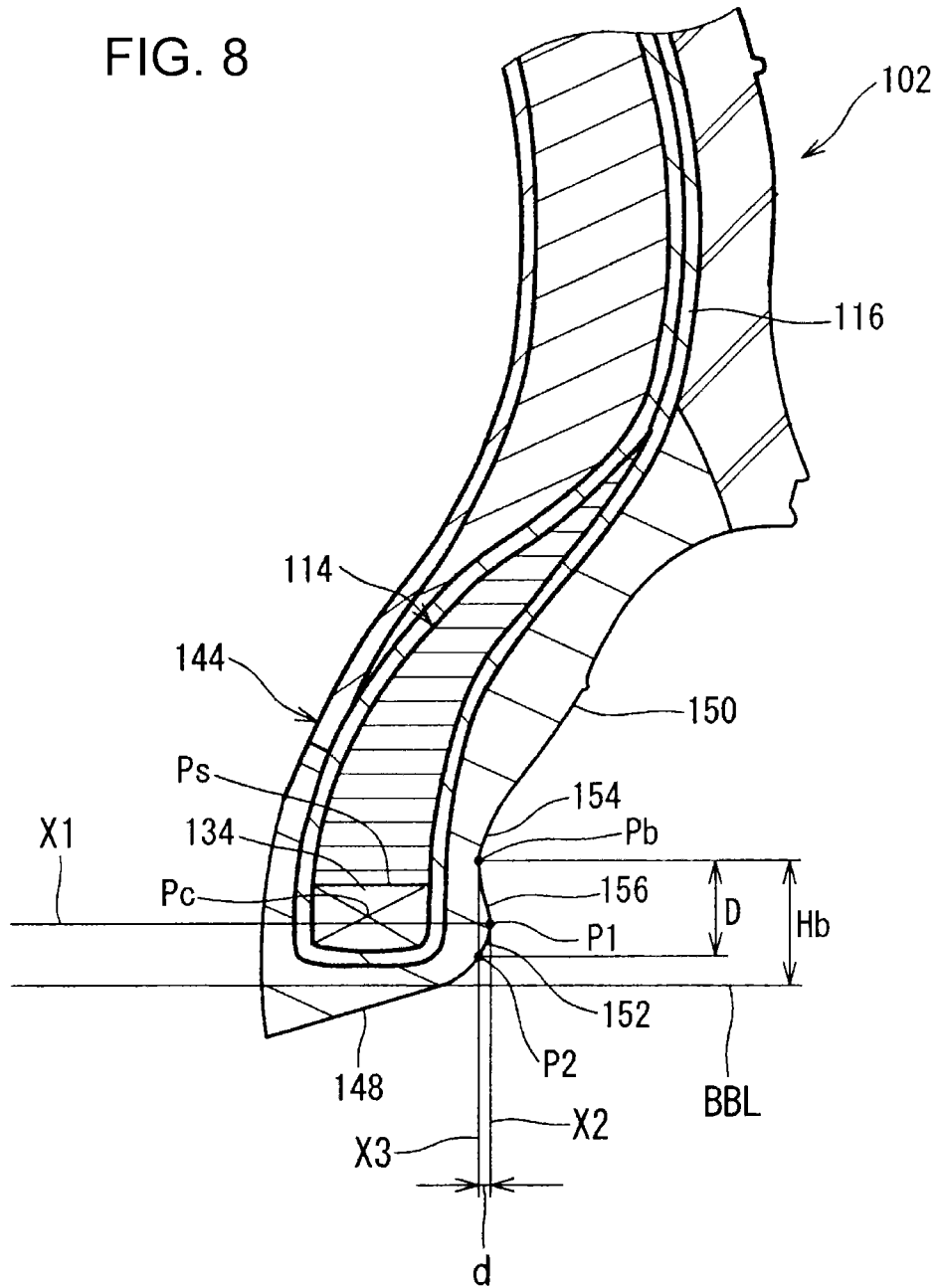
FIG. 8 is a cross-sectional view showing another part of the tire in FIG. 6.

FIG. 8 shows part of a cross section of tire 102 in FIG. 6. In FIG. 8, the vertical directions correspond to radial directions of tire 102 and the horizontal directions correspond to axial directions of tire 102. Directions perpendicular to the drawing sheet correspond to circumferential directions of tire 102. FIG. 8 shows the section where bead 114 is formed in tire 102.

The portion of bead 114 extends in a circumferential direction of tire 102. When tire 102 is mounted on a rim, the portion of bead 114 is fitted to the rim. The portion of bead 114 of tire 102 includes fitting portion 144 that extends in a circumferential direction and is fitted to the rim, the same as in tire 22 shown in FIG. 1. External surface 146 of fitting portion 144 faces the rim when the tire is fitted to the rim.

External surface 146 of fitting portion 144 in tire 102 has the same structure as employed above for external surface 68 of fitting portion 66 in tire 22. Fitting portion 144 has bottom surface 148 positioned on its radially inner side, and side surface 150 positioned on its axially outer side. Bottom surface 148 includes heel 152 on its axially outer side. Side surface 150 includes concave 154 extending in a circumferential direction.

In FIG. 8, mark (P1) denotes the axially outer edge of bottom surface 148 (first base point). Solid line (X1) indicates a virtual straight line passing through first base point (P1) and extending in an axial direction (first base line), and solid line (X2) is a virtual straight line passing through first base point (P1) and extending in a radial direction (second base line).

As described above, side surface 150 of fitting portion 144 in tire 102 includes concave 154 extending in a circumferential direction. When tire 102 is fitted to a rim, concave 154 faces the flange of the rim. As illustrated, concave 154 is recessed from second base line (X2) in an axially inward direction. Thus, when tire 102 is fitted to a rim, fitting portion 144 bends originating at concave 154 and causes portions on the radially outer side of concave 154 to extend in an axially outward direction. As a result, fitting portion 144 is supported by the rim mainly at portions on the radially outer side of concave 154 and at portions on the radially inner side of concave 154. Fitting portion 144 of tire 102 is fixed to the rim because the rim is sandwiched between portions on the radially outer side of concave 154 and portions on the radially inner side of concave 154. Thus, fitting portion 144 of tire 102 is less likely to move relative to the rim even when tire 102 is running under punctured conditions. Since fitting portion 144 is suppressed from moving relative to the rim, fitting portion 144 is less likely to be damaged even when tire 102 is running under punctured conditions. Tire 102 exhibits excellent durability under punctured conditions (also referred to as run-flat durability).

During normal running conditions of tire 102, fitting portion 144 is also less likely to move relative to a rim. Fitting portion 144 is less likely to be damaged under normal running conditions. Tire 102 exhibits excellent durability under normal running conditions as well. Since driving force is effectively transmitted from the vehicle to the ground and from the ground to the vehicle, tire 102 exhibits excellent steering stability.

In tire 102, heel 152 of fitting portion 144 is shaped in an arc having its center on first base line (X1) and originating at first base point (P1). When tire 102 is fitted to a rim, fitting portion 144 makes tight contact with the rim, since heel 152 is shaped in an arc.

In tire 102, heel 152 makes contact with side surface 150 at first base point (P1). Thus, when tire 102 is fitted to a rim, fitting portion 144 makes tight contact with the rim. Especially, in tire 102, hem 156 of concave 154 at side surface 150 is shaped in an arc having its center positioned on the axially inner side of side surface 150. The arc makes contact with heel 152 at first base point (P1). In other words, concave 154 of side surface 150 in tire 102 includes the arc that makes contact with heel 152 at first base point (P1). Since hem 156 of concave 154 is rounded in tire 102, chipping is less likely to occur at hem 156. Moreover, such a structure creates a greater contact force, and fitting portion 144 is less likely to move relative to the rim. Tire 102 exhibits excellent durability and steering stability. Even when tire 102 runs under punctured conditions, fitting portion 144 is less likely to be damaged. Tire 102 exhibits excellent run-flat durability.

In FIG. 8, mark (Pb) denotes the bottom of concave 154. Solid line (X3) indicates a virtual straight line that passes through the bottom (Pb) of concave 154 and extends in a radial direction (third base line). Double-headed arrow (d) indicates the axial distance from second base line (X2) to third base line (X3).

In tire 102, distance (d) is at least 1.0 mm but no greater than 2.0 mm. By setting distance (d) to be at least 1.0 mm, concave 154 contributes effectively to the bending of fitting portion 144. Since fitting portion 144 is suppressed from moving relative to a rim, fitting portion 144 is less likely to be damaged. Tire 102 exhibits excellent run-flat durability. Moreover, since fitting portion 144 is suppressed from moving relative to a rim under normal conditions as well, tire 102 exhibits excellent durability and steering stability under normal conditions. From those viewpoints, distance (d) is preferred to be at least 1.2 mm. When distance (d) is 2.0 mm or less, the thickness of clinch 112 at bottom (Pb) of concave 154 is appropriately maintained. Since the rubber positioned outside the cords contained in carcass 116 has a sufficient thickness where concave 154 is present in tire 102, the cords are prevented from being exposed, even though concave 154 is formed. From such a viewpoint, distance (d) is preferred to be 1.5 mm or less.

In FIG. 8, solid line (BBL) indicates the bead base line. Double-headed arrow (Hb) indicates the radial height from the bead base line to bottom (Pb) of concave 154. Mark (Pc) denotes the center of core 134 of bead 114. Mark (Ps) denotes the radially outer edge of core 134.

Height (Hb) in tire 102 is preferred to be 20 mm or less. By so setting, fitting portion 144 of tire 102 is fixed to a rim because the rim is sandwiched between portions on the radially outer side of concave 154 and portions on the radially inner side of concave 154. Fitting portion 144 is less likely to move relative to the rim. Since fitting portion 144 is suppressed from moving relative to the rim, it is less likely to be damaged. Tire 102 exhibits excellent run-flat durability. Moreover, even under normal conditions, since fitting portion 144 is less likely to move relative to the rim, tire 102 also exhibits excellent durability and steering stability under normal running conditions. From those viewpoints, height (Hb) is more preferably 17 mm or less, even more preferably 15 mm or less.

Height (Hb) is preferred to be at least 5 mm in tire 102. By so setting, concave 154 contributes effectively to the bending of fitting portion 144. In such a case as well, since fitting portion 144 is suppressed from moving relative to the rim, fitting portion 144 is less likely to be damaged. Tire 102 exhibits excellent run-flat durability. Moreover, since fitting portion 144 is less likely to move relative to the rim under normal conditions as well, tire 102 also exhibits excellent durability and steering stability under normal running conditions. From such viewpoints, height (Hb) is more preferably at least 6 mm, even more preferably at least 8 mm.

Bead 114 of tire 102 is also provided with core 134 which includes wound non-stretchable wire the same as in bead 30 of tire 22. In tire 102, since concave 154 effectively contributes to the bending of fitting portion 144, bottom (Pb) of concave 154 is preferred to be positioned on the radially outer side of center (Pc) of core 134. Bottom (Pb) is more preferred to be positioned on the radially outer side of radially outer edge (Ps) of core 134. Tire 102 exhibits excellent run-flat durability. Moreover, even under normal running conditions, since fitting portion 144 is less likely to move relative to the rim, tire 102 exhibits excellent durability and steering stability under normal running conditions.

In FIG. 8, mark (P2) denotes the intersection of third base line (X3) and bottom surface 148 of fitting portion 144 (second base point). Double-headed arrow (D) indicates the radial distance from second base point (P2) to bottom (Pb) of concave 154.

The depth of concave 154 and the position of bottom (Pb) of concave 154 affect the ease and degree of bending of fitting portion 144. For concave 154 to effectively contribute to the bending of fitting portion 144, the ratio of distance (d) to distance (D) is preferred to be in a range of 0.1 to 0.5. By so setting, fitting portion 144 in tire 102 is effectively suppressed from moving relative to the rim. Tire 102 exhibits excellent run-flat durability. Moreover, even under normal running conditions, tire 102 exhibits excellent durability and steering stability, since fitting portion 144 is suppressed from moving relative to the rim.

Distance (D) in tire 102 is preferred to be 15 mm or less. By so setting, fitting portion 144 of tire 102 is fixed to the rim because the rim is sandwiched between portions on the radially outer side of concave 154 and portions on the radially inner side of concave 154. Fitting portion 144 of tire 102 is less likely to move relative to the rim. Fitting portion 144, as it is suppressed from moving relative to the rim, contributes to run-flat durability as well as to durability and steering stability of tire 102 under normal running conditions. Distance (D) in tire 102 is preferred to be at least 5 mm. By so setting, concave 154 can function effectively as the bending starting point of fitting portion 144. In such a case as well, fitting portion 144 is less likely to move relative to the rim. Tire 102 exhibits excellent run-flat durability. Moreover, since fitting portion 144 is suppressed from moving relative to the rim under normal running conditions as well, tire 102 also exhibits excellent durability and steering stability under normal running conditions.

Figure 9:
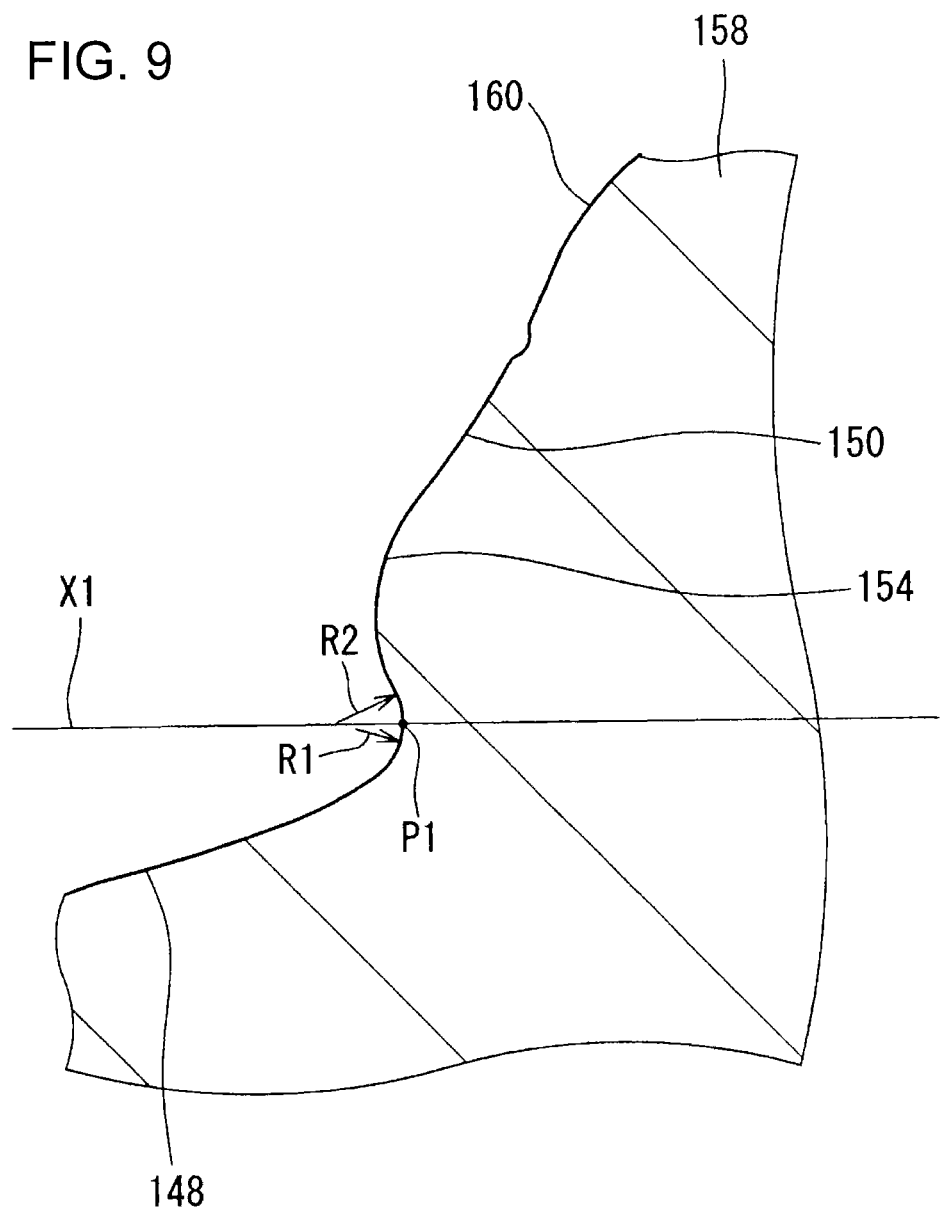
FIG. 9 is a cross-sectional view showing part of the mold for manufacturing the tire shown in FIG. 6.

FIG. 9 shows part of mold 158 to be used for manufacturing tire 102 shown in FIG. 6. Cavity surface 160 of mold 158 shown in FIG. 9 corresponds to external surface 146 of fitting portion 144 in tire 102. In FIG. 9, vertical directions correspond to radial directions of tire 102, horizontal directions correspond to axial directions of tire 102, and directions perpendicular to the drawing sheet correspond to circumferential directions of tire 102.

In FIG. 9, mark (R1) denotes the curvature radius of a first arc that shapes heel 152. Mark (R2) denotes the curvature radius of a second arc that shapes hem 156 of concave 154. As described above, solid line (X1) is the first base line passing through first base point (P1) and extending in an axial direction.

As described above, heel 152 shaped in an arc contributes to having fitting portion 144 make tight contact with the rim. For fitting portion 144 to make tight contact with the rim, curvature radius (R1) is preferred to be at least 2 mm but no greater than 10 mm.

In tire 102, curvature radius (R2) of the second arc is preferred to be 11 mm or less. By so setting, hem 156 of concave 154 contributes to generating a greater contact force. In tire 102, fitting portion 144 is less likely to move relative to the rim. Fitting portion 144, as it is suppressed from moving relative to the rim, contributes to run-flat durability as well as to the durability and steering stability of tire 102 under normal running conditions. From those viewpoints, curvature radius (R2) is more preferably 8 mm or less, even more preferably 4 mm or less, especially preferably 3 mm or less. From the viewpoint of preventing formation of such an edge that may cause chipping, curvature radius (R2) is preferred to be at least 1 mm, more preferably at least 2 mm.

EXAMPLES

In the following, the effects of an embodiment of the present invention are made clear by referring to examples. However, the present invention is not limited to the descriptions in those examples.

Example 1

A pneumatic tire (run-flat tire) having the basic structure shown in FIG. 6 and specifications listed in Table 1 below was prepared as Example 1. The tire size was 225/40R18. In Example 1, bottom (Pb) of the concave is positioned on the radially outer side of center (Pc) of the core. Such a structure is denoted as "out" in the column "bottom."

Comparative Example 1

A conventional tire was used as Comparative Example 1. No concave is formed in Comparative Example 1.

Example 2~5, Comparative Example 2~3

Tires were prepared for Example 2~5 and Comparative Example 2~3 by employing the same procedure as in Example 1 except that axial distance (d) from first base point (P1) to bottom (Pb) of the concave, the axial distance (D) from second base point (P2) to bottom (Pb) of the concave, and ratio (d/D) of distance (d) to distance (D) were set as specified in Table 1 below respectively.

Example 6~13

Tires were prepared for Example 6~13 the same as in Example 1 except that radial height (Hb) from the bead base line to bottom (Pb) of the concave, distance (D), and the ratio (d/D) were set as specified in Table 2 below. Among Example 6~13, the bottom (Pb) of the concave in Example 6 was positioned on the radially inner side of center (Pc) of the core. Such a structure is denoted as "in" in the column "bottom" of Table 2.

Example 14~21

Tires were prepared for Example 14~21 the same as in Example 1 except that curvature radius (R2) of the second arc in the concave was specified in Table 3 below.

Durability

Each tire was mounted on a normal rim, and was filled with air at an inflation pressure of 250 kPa. The tire was mounted on a drum testing machine and a longitudinal load of 6.68 kN was applied on the tire. The tire was run on a drum with a radius of 1.7 m at a speed of 100 km/hr. After test running of 20,000 km, the exterior appearance of the tire was observed to check the degree of damage. The results are shown in Table 1~3 below in indices with Comparative Example 1 being set at 100. The greater the value is, the better the tire is. Namely, the tire has excellent durability under normal running conditions.

Steering Stability and Riding Comfort

Each tire was mounted on an 18×8.0 J rim, and was filled with air at an inflation pressure of 250 kPa. The tires were mounted on a passenger car with a displacement of 2499 cc. A test driver drove the passenger car on a racing circuit, and the driver evaluated steering stability and riding comfort under normal running conditions. The results are shown in Table 1~3 below in indices with Comparative Example 1 being set at 100. The greater the value is, the better the tire is.

Durability (Under Punctured Conditions)

Each tire was mounted on a normal rim and was filled with air at an inflation pressure of 250 kPa. The tire was mounted on a drum running testing machine and a longitudinal load of 3.57 kN was applied on the tire. Then, the tire was punctured as the inflation pressure above was set at a normal pressure. The tire was run on a drum with a radius of 1.7 m at a speed of 80 km/hr. The running distance till the tire was damaged was checked. The results are shown in Table 1~3 below in indices with comparative Example 1 being set at 100. The greater the value is, the better the tire is. Namely, the tire has excellent run-flat durability.

TABLE 1

Evaluation Results

|  | Comp. Example 1 | Comp. Example 2 | Example 2 | Example 3 | Example 1 | Example 4 | Example 5 | Comp. Example 3 |
|---|---|---|---|---|---|---|---|---|
| Distance d [mm] | — | 0.5 | 1.0 | 1.2 | 1.3 | 1.5 | 2.0 | 2.5 |
| Height Hb [mm] | — | 9.0 | 9.0 | 9.0 | 9.0 | 9.0 | 9.0 | 9.0 |
| Bottom | — | out | out | out | out | out | out | out |
| Radius R2 [mm] | — | 3.0 | 3.0 | 3.0 | 3.0 | 3.0 | 3.0 | 3.0 |
| Distance D [mm] | — | 5.0 | 5.9 | 6.1 | 6.2 | 6.4 | 6.9 | 7.3 |
| Ratio (d/D) | — | 0.10 | 0.17 | 0.20 | 0.21 | 0.23 | 0.29 | 0.34 |
| Steering stability | 100 | 101 | 103 | 104 | 105 | 105 | 106 | 106 |
| Durability (when punctured) | 100 | 105 | 130 | 140 | 150 | 140 | 120 | 103 |

TABLE 2

Evaluation Results

|  | Example 6 | Example 7 | Example 8 | Example 9 | Example 10 | Example 11 | Example 12 | Example 13 |
|---|---|---|---|---|---|---|---|---|
| Distance d [mm] | 1.3 | 1.3 | 1.3 | 1.3 | 1.3 | 1.3 | 1.3 | 1.3 |
| Height Hb [mm] | 6.0 | 8.0 | 8.5 | 10.0 | 11.0 | 12.0 | 13.0 | 15.0 |
| Bottom | in | out | out | out | out | out | out | out |
| Radius R2 [mm] | 3.0 | 3.0 | 3.0 | 3.0 | 3.0 | 3.0 | 3.0 | 3.0 |
| Distance D [mm] | 3.2 | 5.2 | 5.7 | 7.2 | 8.2 | 9.2 | 10.2 | 12.2 |
| Ratio (d/D) | 0.41 | 0.25 | 0.23 | 0.18 | 0.16 | 0.14 | 0.13 | 0.11 |
| Steering stability | 101 | 103 | 104 | 105 | 104 | 104 | 103 | 101 |
| Durability (when punctured) | 110 | 130 | 140 | 145 | 140 | 135 | 130 | 110 |

TABLE 3

Evaluation Results

|  | Example 14 | Example 15 | Example 16 | Example 17 | Example 18 | Example 19 | Example 20 | Example 21 |
|---|---|---|---|---|---|---|---|---|
| Distance d [mm] | 1.3 | 1.3 | 1.3 | 1.3 | 1.3 | 1.3 | 1.3 | 1.3 |
| Height Hb [mm] | 9.0 | 9.0 | 9.0 | 9.0 | 9.0 | 9.0 | 9.0 | 9.0 |
| Bottom | out | out | out | out | out | out | out | out |
| Radius R2 [mm] | 1.0 | 2.0 | 3.5 | 4.0 | 5.0 | 8.0 | 11.0 | 12.0 |
| Distance D [mm] | 6.2 | 6.2 | 6.2 | 6.2 | 6.2 | 6.2 | 6.2 | 6.2 |
| Ratio (d/D) | 0.21 | 0.21 | 0.21 | 0.21 | 0.21 | 0.21 | 0.21 | 0.21 |
| Steering stability | 106 | 106 | 105 | 104 | 104 | 103 | 102 | 101 |
| Durability (when punctured) | 115 | 135 | 145 | 140 | 135 | 130 | 125 | 110 |

As shown in Table 1~3, the tires of the examples have higher evaluations than those in the comparative examples. Those evaluation results clearly indicate tires according to an embodiment of the present invention are excellent.

The tires described above can be mounted on various types of vehicles.

Figure 10:
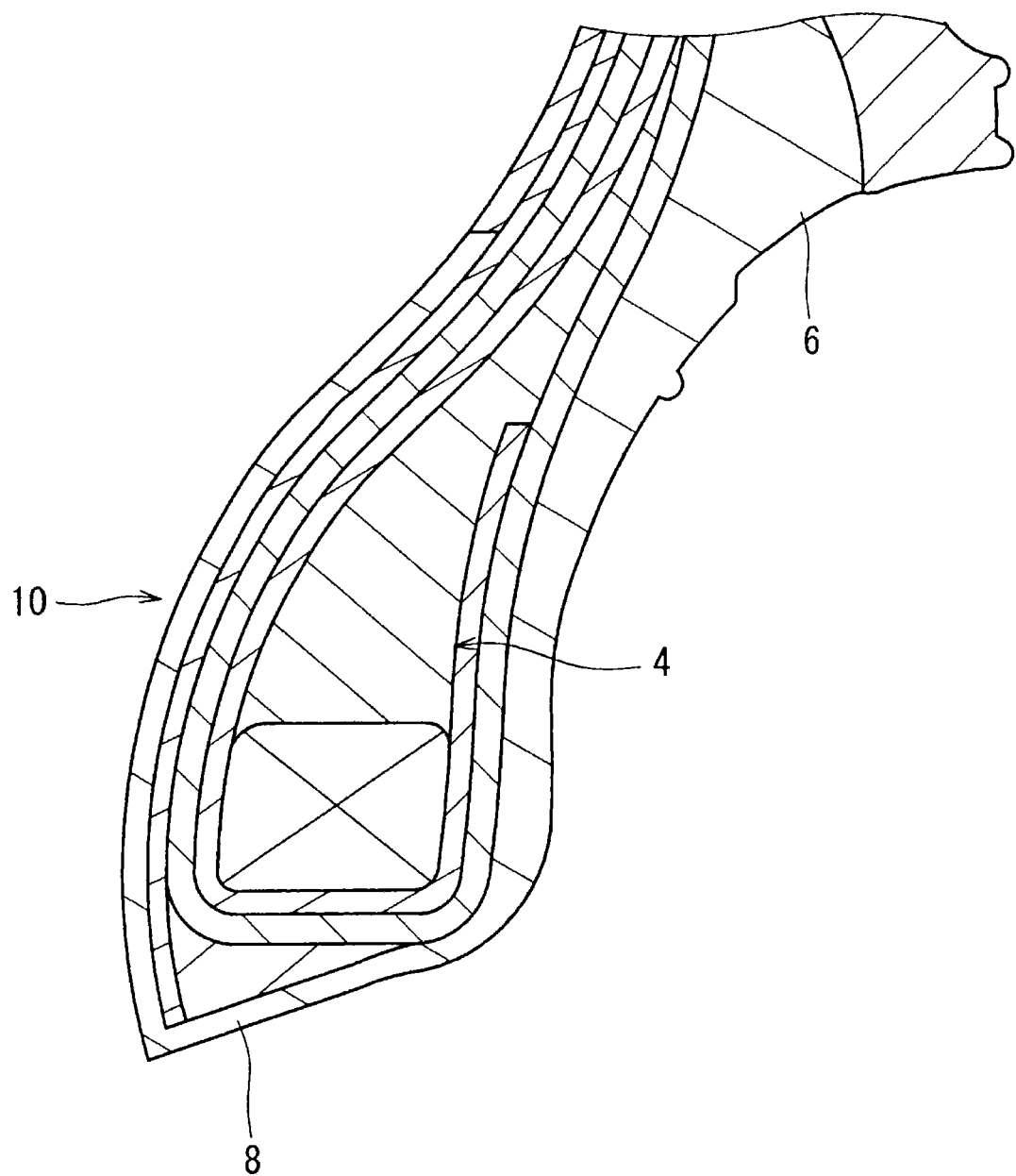
FIG. 10 is a cross-sectional view showing part of a conventional pneumatic tire.

FIG. 10 shows the portion of bead 4 of a conventional tire 2. Tire 2 has clinch 6 on the axially outer side of bead 4. Tire 2 is further provided with chafer 8 on the radially inner side of bead 4. Chafer 8 of tire 2 is integrated with clinch 6.

The portion of bead 4 of tire 2 is fitted to a rim. The shape of the rim is specified by JATMA regulations, for example. The portion of bead 4 in tire 2 is also referred to as fitting portion 10.

Figure 11:
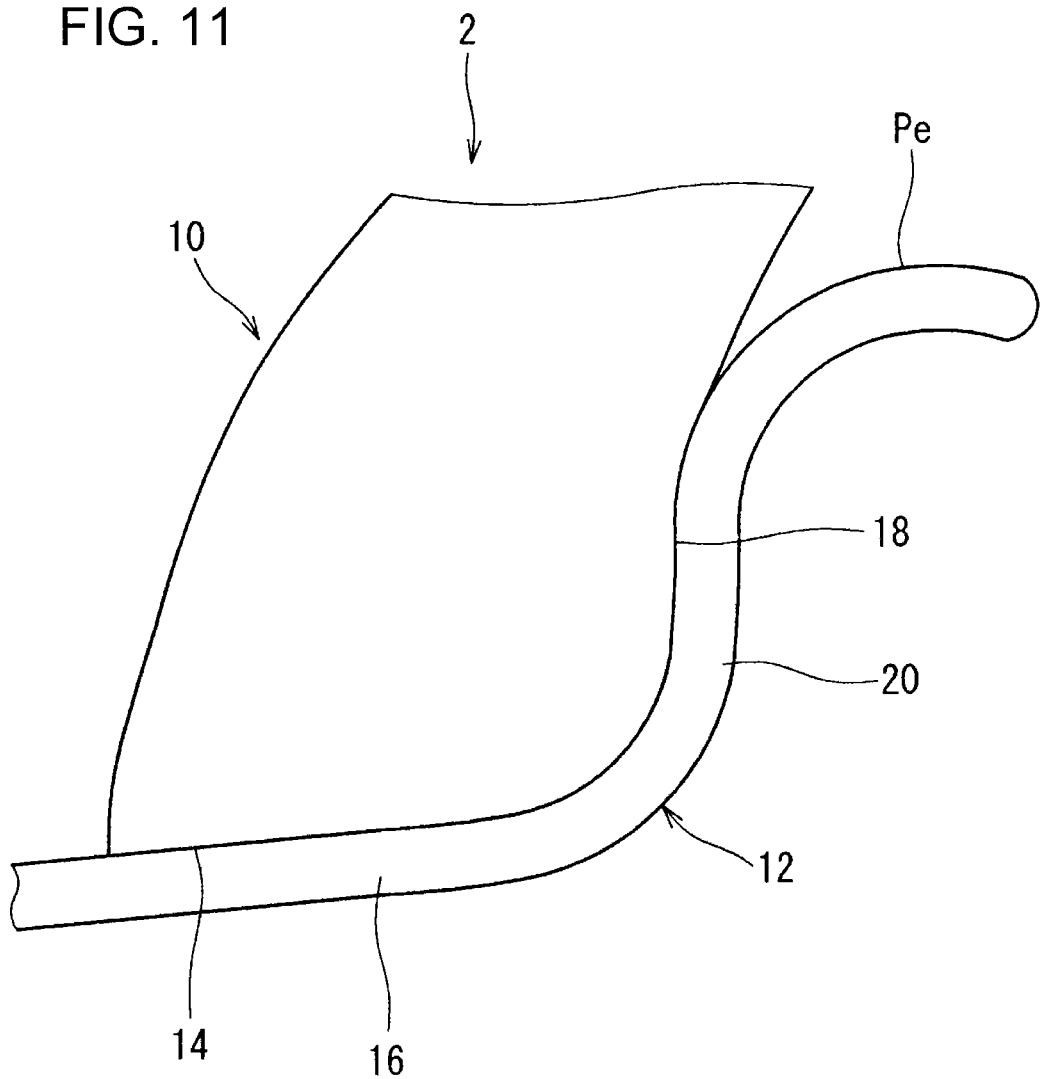
FIG. 11 is a cross-sectional view showing when the tire in FIG. 10 is in use.

FIG. 11 shows how tire 2 shown in FIG. 10 is used. As shown in the drawing, when fitting portion 10 is fitted to rim 12, radially internal surface 14 is mounted on seat 16 of rim 12. Axially external surface 18 of fitting portion 10 abuts flange 20 of rim 12. Internal surface 14 and external surface 18 are usually formed to correspond to the shape of rim 12.

From the viewpoint of steering stability, a highly rigid fitting portion 10 may occasionally be employed. However, such a fitting portion 10 may lower riding comfort. From the viewpoint of riding comfort, fitting portion 10 with low rigidity may be employed. However, such a fitting portion 10 may lower steering stability. The rigidity of a fitting portion 10 affects the performance of tire 2. JP2001-146105A, for example, describes a study on the rigidity of a fitting portion 10. The entire contents of this publication are incorporated herein by reference.

It is important for tire 2 to maintain contact with rim 12. In the present invention, the contact conditions of fitting portion 10 of tire 2 and rim 12 were checked when a load was applied on tire 2. In such a study, a pressure-sensitive plate (not shown) was inserted between fitting portion 10 and rim 12 to measure contact pressure.

Figure 12:
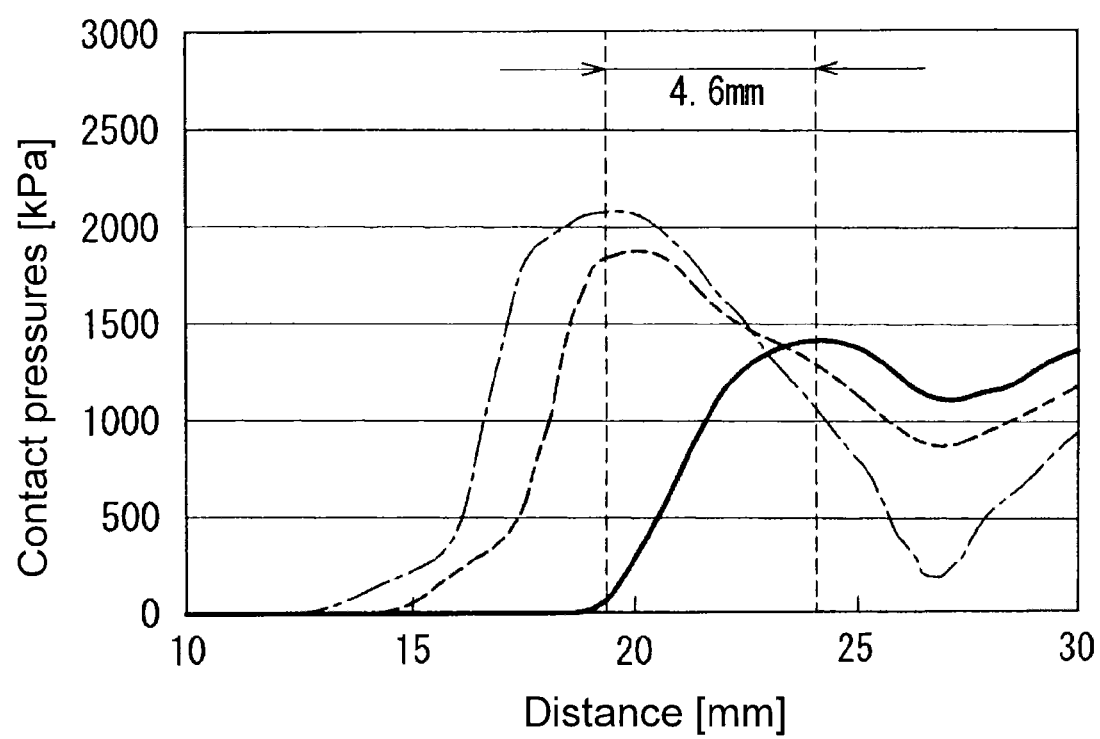
FIG. 12 is a graph showing the results of measuring contact pressures on the tire shown in FIG. 10.

FIG. 12 shows the relationship of contact pressure and distance from the base position when the radially outer edge of flange 20 ("Pe" in FIG. 11) is set as the base position. In FIG. 12, the horizontal axis indicates distance from the base position, and the vertical axis indicates contact pressure. The solid line shows measurement results when no load is applied. The broken line shows measurement results when a load is applied vertically on tire 2 (longitudinal load). The chain line shows measurement results when another load is applied horizontally on tire 2 (lateral load) while keeping the longitudinal load.

As shown in the graph, it was found that when a load is applied, the peak contact-pressure position is significantly shifted from the peak contact-pressure position of no load applied thereon. The maximum shifting amount was 4.6 mm.

When the peak contact-pressure position shifts, it indicates fitting portion 10 has moved relative to rim 12. A greater shifting amount indicates fitting portion 10 is more likely to move relative to rim 12.

Tire 2 repeats deformation and restoration during its run. Thus, fitting portion 10 is likely to be damaged, since it tends to move relative to rim 12. Fitting portion 10 affects the durability of tire 2. Moreover, because fitting portion 10 tends to move relative to rim 12, transmission of driving force from the vehicle to the ground and from the ground to the vehicle may be hindered. Fitting portion 10 affects the stability of the steering wheel such as responsiveness and feel when the steering angle is very small.

As described above, a run-flat tire is expected to run under punctured conditions (also referred to as run-flat driving). A greater load is exerted on the fitting portion during run-flat driving. Because fitting portion 10 tends to move relative to rim 12, the fitting portion affects the durability of the tire under punctured conditions (also referred to as run-flat durability).

A pneumatic tire according to an embodiment of the present invention provides excellent durability and steering stability. A run-flat tire according to another embodiment of the present invention exhibits excellent durability under punctured conditions.

A pneumatic tire according to one aspect of the present invention has: a tread having a tread surface on its outer surface; a pair of sidewalls each extending from an edge of the tread in an approximately radially inward direction; a pair of clinches each extending from an edge of the sidewall in an approximately radially inward direction; a pair of beads each positioned on the axially inner side of the clinch; and a carcass extending along the inner side of the tread and sidewalls to bridge one bead and the other bead. The bead portions each include a fitting portion that extends in a circumferential direction to be fitted to a rim. The fitting portion is provided with a bottom surface positioned on the radially inner side and a side surface positioned on the axially outer side. The bottom surface includes a heel on its axially outer side. The side surface includes a concave extending in a circumferential direction.

In a cross section perpendicular with respect to a circumferential direction of the tire, when the axially outer edge of the bottom surface is set as a first base point, when a virtual straight line that passes through the first base point and extends in an axial direction is set as a first base line, and when a virtual straight line that passes through the first base point and extends in a radial direction is set as a second base line, the heel is shaped as a first arc having its center on the first base line and originating at the first base point. The heel makes contact with the side surface at the first base point. The concave is recessed from the second base line in an axially inward direction. Axial distance (d) from the first base point to the bottom of the concave is at least 1.0 mm but no greater than 2.0 mm.

In the pneumatic tire, radial height (Hb) from the bead base line to the bottom of the concave is preferred to be at least 5 mm but no greater than 20 mm.

In the pneumatic tire, the bead is preferred to have a core and an apex that extends from the core in a radially outward direction. The bottom of the concave is positioned on the radially outer side of the center of the core.

In the pneumatic tire, the concave includes a second arc that makes contact with the heel at the first base point in the above vertical cross section. The curvature radius (R2) of the second arc is 11 mm or less.

In the pneumatic tire, when a virtual straight line that passes through the bottom of the concave and extends in a radial direction is set as a third base line, and when the intersection of the third base line and the bottom surface is set as a second base point in the above vertical cross section, radial distance (D) from the second base point to the bottom of the concave and the axial distance (d) are preferred to have a ratio in a range of 0.1 to 0.5.

In the pneumatic tire, radial distance (D) is preferred to be at least 5 mm but no greater than 15 mm.

The pneumatic tire is preferred to be a run-flat tire, wherein the tire is a run-flat type further including a load-support layer positioned on the axially inner side of the sidewall.

The pneumatic tire is preferred to have a profile whose curvature radius gradually decreases from a point (TC) on the tire equator in an axially outward direction.

In the pneumatic tire, the profile is preferred to satisfy formulas (1)~(4) below.

$$0.05 < Y_{60}/H \leq 0.10 \quad (1)$$

$$0.10 < Y_{75}/H \leq 0.2 \quad (2)$$

$$0.2 < Y_{90}/H \leq 0.4 \quad (3)$$

$$0.4 < Y_{100}/H \leq 0.7 \quad (4)$$

(In above formulas (1)~(4), "H" indicates the height of a tire, and "$Y_{60}$, $Y_{75}$, $Y_{90}$, $Y_{100}$" indicate radial distances between point (TC) and points "$P_{60}$, $P_{75}$, $P_{90}$, $P_{100}$" respectively. Points "$P_{60}$, $P_{75}$, $P_{90}$, $P_{100}$" are the points on the profile, respectively indicating axial distances from point (TC) by 60%, 75%, 90% and 100% of the tire half width.)

In a pneumatic tire according to an embodiment of the present invention, the side surface of a fitting portion includes a concave that extends in a circumferential direction. Thus, when the tire is mounted on a rim, the fitting portion bends originating at the concave. Accordingly, the fitting portion is supported mainly by the rim at portions positioned on the radially outer side of the concave and at portions positioned on the radially inner side of the concave. Moreover, axial distance (d) from the first base point to the bottom of the concave, corresponding to the depth of the concave, is adjusted properly in the tire. The fitting portion is effectively suppressed from moving relative to the rim while the tire is running Thus, the fitting portion is less likely to be damaged. The tire exhibits excellent durability. Since driving force is effectively transmitted from the vehicle to the ground and from the ground to the vehicle, the tire exhibits excellent steering stability.

In a run-flat tire having the aforementioned fitting portion, the fitting portion is effectively suppressed from moving relative to a rim even under punctured conditions. The fitting portion of the run-flat tire is less likely to be damaged during run-flat driving. The run-flat tire exhibits excellent durability during its run under punctured conditions.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
   a tread;
   a pair of sidewalls extending from edges of the tread substantially in a radially inward direction, respectively;
   a pair of clinches extending from edges of the sidewalls substantially in the radially inward direction, respectively;
   a pair of beads positioned on axially inner sides of the clinches, respectively; and
   a carcass extending along an inner side of the tread and sidewalls such that the carcass is bridging the pair of beads,
   wherein the pneumatic tire has a fitting portion extending in a circumferential direction and configured to be fitted to a rim, the fitting portion has a bottom surface positioned on a radially inner side of the fitting portion and a side surface positioned on an axially outer side of the fitting portion, the bottom surface of the fitting portion includes a heel on the axially outer side of the fitting portion, the side surface of the fitting portion includes a concave extending in the circumferential direction, the heel of the bottom surface is shaped in a first arc such that the first arc has the center on a first base line and is originating at a first base point, that the heel makes contact with the side surface at the first base point, that the concave of the side surface is recessed from a second base line in an axially inward direction, and that an axial distance from the first base point to the bottom of the concave is in a range of from 1.0 mm to 2.0 mm, where in a cross section perpendicular with respect to the circumferential direction, the first base point is an axially outer edge of the bottom surface, the first base line is a virtual straight line passing through the first base point and extending in an axial direction, and the second base line is a virtual straight line passing through the first base point and extending in a radial direction.

2. The pneumatic tire according to claim 1, wherein a radial height from a bead base line to the bottom of the concave is formed in a range of 5 mm to 20 mm.

3. The pneumatic tire according to claim 1, wherein each of the beads comprises a core and an apex extending from the core in a radially outward direction, and the bottom of the concave is positioned on a radially outer side of the center of the core.

4. The pneumatic tire according to claim 1, wherein in a vertical cross section, the concave comprises a second arc such that the second arc makes contact with the heel at the first base point and has a curvature radius of 11 mm or less.

5. The pneumatic tire according to claim 1, wherein a radial distance from a second base point to the bottom of the concave and the axial distance are set to have a ratio in a range of 0.1 to 0.5, where the ratio is the axial distance to the radial distance, and in a vertical cross section, the second base point is an intersection of the bottom surface and a third base line which is a virtual straight line passing through the bottom of the concave and extending in the radial direction.

6. The pneumatic tire according to claim 5, wherein the radial distance is set in a range of from 5 mm to 15 mm.

7. A run-flat tire, comprising the pneumatic tire according to claim 1, wherein the pneumatic tire has a load-support layer positioned on an axially inner side of each of the sidewalls.

8. The run-flat tire according to claim 7, wherein the pneumatic tire has a profile whose curvature radius gradually decreases from a TC point on a tire equator in an axially outward direction.

9. The run-flat tire according to claim 8, wherein the profile of the pneumatic tire satisfies: $0.05 < Y_6/H \leq 0.10$; $0.10 < Y_{75}/H \leq 0.2$; $0.2 < Y_{90}/H \leq 0.4$; and $0.4 < Y_{100}/H \leq 0.7$, where H is a height of the pneumatic tire, $Y_{60}$, $Y_{75}$, $Y_{90}$ and $Y_{100}$ are radial distances between the TC point and points, $P_{60}$, $P_{75}$, $P_{90}$ and $P_{100}$, respectively, and the points, $P_{60}$, $P_{75}$, $P_{90}$ and $P_{100}$, are points on the profile, respectively, indicating axial distances from the TC point by 60%, 75%, 90% and 100% of a tire half width.

10. The pneumatic tire according to claim 2, wherein each of the beads comprises a core and an apex extending from the core in a radially outward direction, and the bottom of the concave is positioned on a radially outer side of the center of the core.

11. The pneumatic tire according to claim 2, wherein in a vertical cross section, the concave comprises a second arc such that the second arc makes contact with the heel at the first base point and has a curvature radius of 11 mm or less.

12. The pneumatic tire according to claim 2, wherein a radial distance from a second base point to the bottom of the concave and the axial distance are set to have a ratio in a range of 0.1 to 0.5, where the ratio is the axial distance to the radial distance, and in a vertical cross section, the second base point is an intersection of the bottom surface and a third base line which is a virtual straight line passing through the bottom of the concave and extending in the radial direction.

13. The pneumatic tire according to claim 12, wherein the radial distance is set in a range of from 5 mm to 15 mm.

14. A run-flat tire, comprising the pneumatic tire according to claim 2, wherein the pneumatic tire has a load-support layer positioned on an axially inner side of each of the sidewalls.

15. The run-flat tire according to claim 14, wherein the pneumatic tire has a profile whose curvature radius gradually decreases from a TC point on a tire equator in an axially outward direction.

16. The run-flat tire according to claim 15, wherein the profile of the pneumatic tire satisfies: $0.05 < Y_{60}/H \leq 0.10$; $0.10 < Y_{75}/H \leq 0.2$; $0.2 < Y_{90}/H \leq 0.4$; and $0.4 < Y_{100}/H \leq 0.7$, where H is a height of the pneumatic tire, $Y_{60}$, $Y_{75}$, $Y_{90}$ and $Y_{100}$ are radial distances between the TC point and points, $P_{60}$, $P_{75}$, $P_{90}$ and $P_{100}$, respectively, and the points, $P_{60}$, $P_{75}$, $P_{90}$ and $P_{100}$, are points on the profile, respectively, indicating axial distances from the TC point by 60%, 75%, 90% and 100% of a tire half width.

17. The pneumatic tire according to claim 3, wherein in a vertical cross section, the concave comprises a second arc such that the second arc makes contact with the heel at the first base point and has a curvature radius of 11 mm or less.

18. The pneumatic tire according to claim 3, wherein a radial distance from a second base point to the bottom of the concave and the axial distance are set to have a ratio in a range of 0.1 to 0.5, where the ratio is the axial distance to the radial distance, and in a vertical cross section, the second base point is an intersection of the bottom surface and a third base line which is a virtual straight line passing through the bottom of the concave and extending in the radial direction.

19. The pneumatic tire according to claim 18, wherein the radial distance is set in a range of from 5 mm to 15 mm.

20. A run-flat tire, comprising the pneumatic tire according to claim 3, wherein the pneumatic tire has a load-support layer positioned on an axially inner side of each of the sidewalls.

* * * * *